United States Patent
Tsai et al.

(10) Patent No.: US 11,800,102 B2
(45) Date of Patent: Oct. 24, 2023

(54) LOW-LATENCY VIDEO CODING METHODS AND APPARATUSES FOR CHROMA SEPARATED TREE

(71) Applicant: MEDIATEK INC., Hsinchu (TW)

(72) Inventors: Chia-Ming Tsai, Hsinchu (TW); Chun-Chia Chen, Hsinchu (TW); Chih-Wei Hsu, Hsinchu (TW); Ching-Yeh Chen, Hsinchu (TW); Tzu-Der Chuang, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/552,963

(22) Filed: Dec. 16, 2021

(65) Prior Publication Data

US 2023/0065083 A1    Mar. 2, 2023

Related U.S. Application Data

(60) Provisional application No. 63/237,557, filed on Aug. 27, 2021.

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/159* (2014.11);
(Continued)

(58) Field of Classification Search
CPC .. H04N 19/119; H04N 19/105; H04N 19/159; H04N 19/176; H04N 19/186; H04N 19/1883
(Continued)

(56) References Cited

U.S. PATENT DOCUMENTS 11,375,242 B1 * 6/2022 Said ................. H04N 19/463
11,425,424 B2 * 8/2022 Lim .................. H04N 19/119
(Continued)

FOREIGN PATENT DOCUMENTS

WO   WO-2020017513 A1 * 1/2020

OTHER PUBLICATIONS

Chinese language office action dated Jun. 23, 2022, issued in application No. TW 111108465.

*Primary Examiner* — Albert Kir
(74) *Attorney, Agent, or Firm* — McClure, Qualey & Rodack, LLP

(57) ABSTRACT

Low-latency video coding methods and apparatuses include receiving input data associated with a current Intra slice composed of Coding Tree Units (CTU), where each CTU includes luma and chroma Coding Tree Blocks (CTBs), partitioning each CTB into non-overlapping pipeline units, and encoding or decoding the CTUs in the current Intra slices by performing processing of chroma pipeline units after beginning processing of luma pipeline units in at least one pipeline stage. Each of the pipeline units is processed by one pipeline stage after another pipeline stage, and different pipeline stages process different pipeline units simultaneously. The pipeline stage in the low-latency video coding methods and apparatuses simultaneously processes one luma pipeline unit and at least one previous chroma pipeline unit within one pipeline unit time interval.

18 Claims, 11 Drawing Sheets

(51) Int. Cl.
  *H04N 19/176*  (2014.01)
  *H04N 19/186*  (2014.01)
  *H04N 19/169*  (2014.01)
  *H04N 19/159*  (2014.01)

(52) U.S. Cl.
  CPC ......... *H04N 19/176* (2014.11); *H04N 19/186* (2014.11); *H04N 19/1883* (2014.11)

(58) Field of Classification Search
  USPC .................................................. 375/240.02
  See application file for complete search history.

(56) References Cited

U.S. PATENT DOCUMENTS

2011/0274178 A1* 11/2011 Onno .................... H04N 19/70
                                                       375/E7.027
2015/0350652 A1* 12/2015 Nellore ................ H04N 19/117
                                                       375/240.02
2018/0089000 A1*  3/2018 Ryu ..................... H04N 19/172
2018/0288446 A1* 10/2018 An ......................... H04N 19/70
2020/0404278 A1* 12/2020 Ye .......................... H04N 19/14
2020/0404298 A1  12/2020 Kuo et al.
2021/0006784 A1   1/2021 Lim et al.
2022/0224890 A1*  7/2022 Lin ........................ H04N 19/96

\* cited by examiner

LOW-LATENCY VIDEO CODING METHODS AND APPARATUSES FOR CHROMA SEPARATED TREE

CROSS REFERENCE TO RELATED APPLICATIONS

The present invention claims priority to U.S. Provisional Patent Application Ser. No. 63/237,557, filed on Aug. 27, 2021, entitled "Low-latency Video Coding Method for Chroma Separated Tree". The U.S. Provisional patent application is hereby incorporated by reference in its entirety.

FIELD OF THE INVENTION

The present invention relates to video coding methods and apparatuses for encoding or decoding video data. In particular, the present invention relates to low-latency video coding for chroma separated tree.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. The VVC standard relies on a block-based coding structure which divides each picture into multiple Coding Tree Units (CTUs) for encoding or decoding. The picture is composed of one or more complete slices and each slice contains one or more complete CTUs. A CTU consists of an N×N block of luminance (luma) samples together with one or more corresponding blocks of chrominance (chroma) samples. For example, each CTU consists of one 128×128 luma Coding Tree Block (CTB) and two 64×64 chroma CTBs for the 4:2:0 chroma subsampling format. Each CTU is further recursively divided into one or more Coding Units (CUs) to adapt to various local characteristics.

The prediction decision in video encoding or decoding is made at the CU level, where all CUs are coded by Intra (spatial) prediction in an Intra (I) slices or each CU is either coded by inter picture (temporal) prediction or Intra picture (spatial) prediction in Predictive (P) or Bi-predictive (B) slice. After obtaining a residual signal generated by the prediction process, the residual signal belonging to a CU is further transformed into transform coefficients for compact data representation, and these transform coefficients are quantized and conveyed to the decoder.

Flexible Coding Unit Partition Flexible CU structures like Quad-Tree-Binary-Tree (QTBT) improve coding performance compared to the Quad-Tree (QT) structure employed in the High Efficiency Video Coding (HEVC) standard. FIG. 1 shows a CTU partitioned according to a QTBT structure. The CTU in FIG. 1 is firstly partitioned by a quad-tree structure, and the resulting quad-tree leaf nodes are adaptively partitioned by a binary-tree structure. After constructing the binary tree structure, binary-tree leaf nodes are denoted as CUs, which are used for prediction and transform without further partitioning. In addition to quad-tree and binary-tree, ternary-tree partitioning is designed to capture objects in the center of blocks. FIG. 2 shows the five splitting types for block partition in the VVC standard, these splitting types are quad-tree 20, vertical binary tree 22, horizontal binary tree 24, vertical center-side ternary-tree 26, and horizontal center-side ternary tree 28. In one flexible CU structure, a CTU is firstly partitioned by a quad-tree structure, and the resulting quad-tree leaf nodes are adaptively partitioned by a sub-tree structure including both binary-tree and ternary-tree splitting types.

Chroma Separated Tree In the VVC standard, the coding tree scheme supports the ability for the luma and chroma components to have a separate coding tree structure. For both Predictive (P) and Bi-predictive (B) slices, luma and chroma CTBs in one CTU have to share the same coding tree structure. For Intra (I) slices, luma and chroma CTBs in one CTU can have separate coding tree structures. Chroma Separated Tree (CST) coding allows different coding trees for processing luma and chroma components in Intra slices to achieve better coding performance, where chroma Cb and chroma Cr components share one coding tree that is different from the luma coding tree. This means that a CU in an I slice may consist of a Coding Block (CB) of the luma component, or CBs of the two chroma components; whereas a CU in a P or B slice always consists of CBs of all three colour components unless the video is monochrome. The coding delay will be significantly increased when encoding or decoding the chroma component with CST coding as there are certain coding tools that involve cross-component data dependency. For example, encoding a chroma block may include evaluating the use of Cross-Component Linear Model (CCLM) modes, where evaluating CCLM modes requires waiting for reconstructed samples of the corresponding luma block. In another example, encoding a chroma block may include evaluating the use of Direct Mode (DM) in Intra prediction, where evaluating DM requires waiting for the angular mode of the corresponding luma block. To wait for the corresponding luma reconstructed samples and luma angular modes, the coding of each chroma CTBs is delayed until the coding of the corresponding luma CTB is completed. The drawbacks of applying CST coding therefore include data throughput reduction and low resource utilization. It is beneficial to design a low-latency video encoding or decoding system for processing video data with CST coding.

BRIEF SUMMARY OF THE INVENTION

Embodiments of low-latency video coding methods for a video encoding or decoding system receive input data associated with a current Intra slice composed of multiple Coding Tree Units (CTUs) for encoding or decoding, each CTU is consisting of a luma Coding Tree Block (CTB) and one or more chroma CTBs, partition each luma CTB into multiple non-overlapping luma pipeline units as well as partition each chroma CTB into multiple non-overlapping chroma pipeline units, and encode or decode the CTUs in the current Intra slice by performing processing of the chroma pipeline units after beginning processing of the corresponding luma pipeline units in at least one pipeline stage. Each of the luma and chroma pipeline units is processed by one pipeline stage after another pipeline stage in the video encoding or decoding system, and different pipeline stages process different pipeline units simultaneously. One luma pipeline unit and at least one previous chroma pipeline unit are simultaneously processed by the pipeline stage within one pipeline unit time interval. A first chroma pipeline unit of a first CTU in the current Intra slice is processed by the pipeline stage after processing a first luma pipeline unit of the first CTU in the current Intra slice by a delay time interval. The delay time interval is defined by a pipeline unit time interval or a predefined delay time interval according to some embodiments, or the delay time interval is defined depending on available luma reconstruction samples according to another embodiment. For example, the first luma pipeline unit of the first CTU is processed by the pipeline stage in a first pipeline unit time interval and a first chroma pipeline unit of the first CTU is processed by the pipeline stage in a predefined pipeline unit time interval, and the predefined pipeline unit time interval is N intervals delayed from the first pipeline unit time interval. N is an integer greater than or equal to 1.

In some embodiments of the low-latency video coding method, one luma pipeline unit and at least one previous chroma pipeline unit are encoded or decoded simultaneously by the pipeline stage in each pipeline unit time interval except for the first N pipeline unit time interval(s) and the last N pipeline unit time interval(s) for processing luma and chroma pipeline units in the current Intra slice. The luma pipeline unit and the at least one previous chroma pipeline unit processed simultaneously belongs to a same CTU or the luma pipeline unit belongs to a current CTU and the at least one previous chroma pipeline unit belong to a previous CTU in a coding order. In some embodiments, Each CTU consists of a luma CTB, a chroma Cr CTB, and a chroma Cb CTB, one luma pipeline unit is encoded or decoded simultaneously by the pipeline stage with one previous chroma Cr pipeline unit and one previous chroma Cb pipeline unit in each pipeline unit time interval except for the first N pipeline time interval(s) and the last N pipeline unit time interval(s). In one specific embodiment where N is equal to 1, the first luma pipeline unit of the first CTU is processed by the pipeline stage in a first pipeline unit time interval and the first chroma pipeline unit of the first CTU is processed by the pipeline stage in a second pipeline unit time interval. Each luma CTB is partitioned into four luma pipeline unit and each chroma CTB is partitioned into four chroma pipeline units. The first chroma pipeline unit of the first CTU is processed simultaneously by the pipeline stage with a second luma pipeline unit of the first CTU in the second pipeline unit time interval; a second chroma pipeline unit of the first CTU is processed simultaneously by the pipeline stage with a third luma pipeline unit of the first CTU in a third pipeline unit time interval; a third chroma pipeline unit of the first CTU is processed simultaneously by the pipeline stage with a last luma pipeline unit of the first CTU in a fourth pipeline unit time interval. A last chroma pipeline unit of the first CTU is processed simultaneously by the pipeline stage with a first luma pipeline unit of a second CTU in the current Intra slice in a fifth pipeline unit time interval.

In some embodiments of low-latency video coding methods, one luma pipeline unit of the first CTU and one previous chroma pipeline unit of the first CTU are encoded or decoded simultaneously by the pipeline stage in at least one pipeline unit time interval, and a first luma pipeline unit of a second CTU in the current Intra slice is processed by the pipeline stage after M pipeline unit time intervals delayed from processing a last luma pipeline unit of the first CTU, where M is equal to N and N is equal to 1, 2, or 3.

In some embodiments of low-latency video coding methods, one luma pipeline unit of the first CTU and multiple chroma pipeline units of the first CTU are processed simultaneously by the pipeline stage in at least one pipeline unit time interval. In one embodiment, first and second chroma pipeline units of each CTU are processed simultaneously by the pipeline stage with a third luma pipeline unit of the same CTU, and third and fourth chroma pipeline units of each CTU are processed simultaneously by the pipeline stage with a first luma pipeline unit of a subsequent CTU. In another embodiment, first and second chroma pipeline units of each CTU are processed simultaneously by the pipeline stage with a third luma pipeline unit of the same CTU, a third chroma pipeline unit of each CTU is processed simultaneously by the pipeline stage with a last luma pipeline unit of the same CTU, and a last chroma pipeline unit of each CTU is processed simultaneously by the pipeline stage with a first luma pipeline unit of a subsequent CTU. In yet another embodiment, a first chroma pipeline unit of each CTU is processed simultaneously by the pipeline stage with a third luma pipeline unit of the same CTU, second and third chroma pipeline units of each CTU are processed simultaneously by the pipeline stage with a last pipeline unit of the same CTU, and a last chroma pipeline unit of each CTU is processed simultaneously by the pipeline stage with a first luma pipeline unit of a subsequent CTU.

For a pipeline unit containing one or more Coding Units (CUs), the CUs are completely contained in the pipeline unit, otherwise for a CU containing one or more pipeline units, the pipeline units are completely contained in the CU. Sizes of the luma and chroma pipeline units may be set to equal to maximum transform unit sizes of luma and chroma components respectively, for example, the size of the luma pipeline units is 64×64 samples and the size of the chroma pipeline units is 32×32 samples. In some other embodiments, sizes of the luma and chroma pipeline units are implicitly defined based on a profile or level of a video compression standard, for example, the size of the luma pipeline units is 32×32 samples and the size of the chroma pipeline units is 16×16 samples. Embodiments of the current Intra slice are encoded or decoded with Chroma Separated Tree (CST) which enables luma CTB and chroma CTBs in one CTU to be encoded or decoded in different coding tree structures.

In some embodiments of the low-latency video coding methods, the method further comprises downsampling luma reconstruction samples and luma neighboring reconstruction samples for each luma pipeline unit, writing luma downsampled reconstruction samples, luma downsampled neighboring reconstruction samples, and luma Intra angular modes associated with each luma pipeline unit into a buffer, and reading luma downsampled reconstruction samples, luma downsampled neighboring reconstruction samples, and luma Intra angular modes of an associated luma pipeline unit from the buffer for encoding or decoding a chroma pipeline unit using Cross-Component Linear Model (CCLM) and Direct Mode (DM) in Intra prediction.

In some other embodiments, a pair of ping-pong buffers is used for encoding or decoding the current Intra slice with CST coding. Luma reconstruction samples and luma neighboring reconstruction samples for each luma pipeline unit in the current Intra slice are downsampled. Luma downsampled reconstruction samples, luma downsampled neighboring reconstruction samples, and luma Intra angular modes associated with even number luma pipeline units of each CTU are written into a first buffer, whereas luma downsampled reconstruction samples, luma downsampled neighboring reconstruction samples, and luma Intra angular modes associated with odd number luma pipeline units of each CTU are written into a second buffer. For encoding or decoding an odd number chroma pipeline unit using CCLM and DM, luma downsampled reconstruction samples, luma downsampled neighboring reconstruction samples, and luma Intra angular modes of an associated odd number of luma pipeline unit are read from the first buffer. For encoding or decoding an even number of chroma pipeline unit using CCLM and DM, luma downsampled reconstruction samples, luma downsampled neighboring reconstruction samples, and luma Intra angular modes of an associated even number of luma pipeline unit are read from the second buffer.

Aspects of the disclosure further provide an apparatus for a video encoding or decoding system. Some embodiments of the apparatus receive input data associated with a current Intra slice, where the current Intra slice is composed of multiple CTUs, and each CTU consists of a luma CTB and one or more chroma CTBs. Each luma CTB is partitioned into multiple non-overlapping luma pipeline units and each chroma CTB is partitioned into multiple non-overlapping chroma pipeline units. Each of the luma and chroma pipeline units is processed by one pipeline stage after another pipeline stage in the video encoding or decoding system, and different pipeline stages process different pipeline units simultaneously. The CTUs in the current Intra slice are encoded or decoded by performing processing of the chroma pipeline units after beginning processing of the corresponding luma pipeline units in at least one pipeline stage. One luma pipeline unit and at least one previous chroma pipeline unit are simultaneously processed by the pipeline stage within one pipeline unit time interval.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
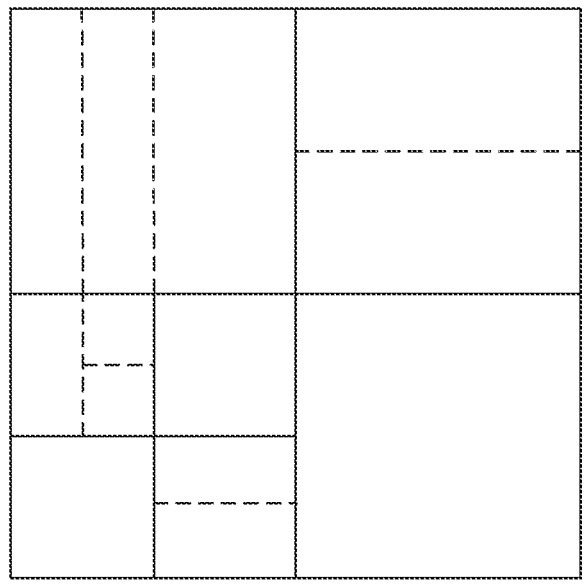
FIG. 1 illustrates an example of partitioning a CTU according to a QTBT structure.
Figure 1:
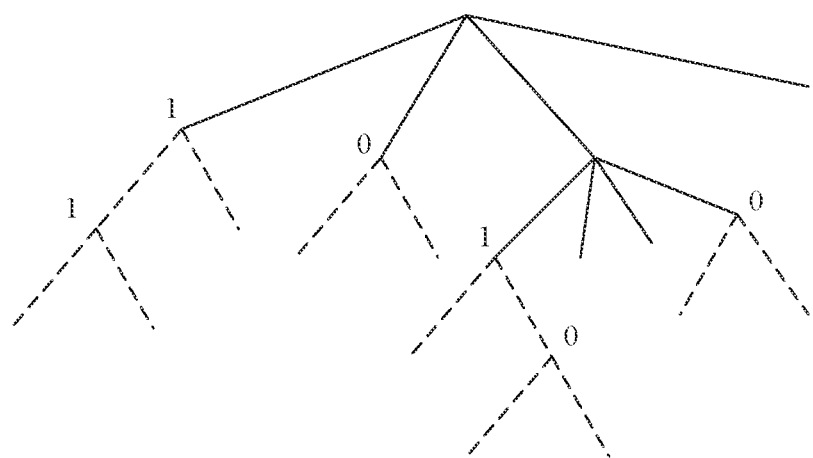
Figure 2:
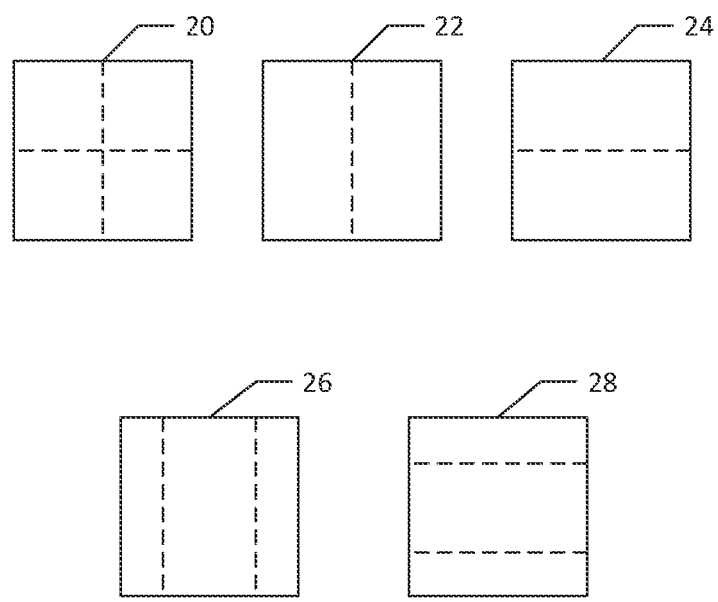
FIG. 2 illustrates five splitting types for block partition including quad-tree, vertical binary tree, horizontal binary tree, vertical center-side ternary-tree, and horizontal center-side ternary tree.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

For further consideration of coding efficiency improvement regarding the picture partitioning structure, the following methods are provided in the present disclosure.

Concept of VPDU A Virtual Pipeline Data Unit (VPDU) is defined as a basic unit for pipeline processing, and the VPDU is also called a pipeline unit in the description. By dividing a video picture into multiple non-overlapping grids for pipeline processing, successive VPDUs may be processed by multiple pipeline stages at the same time, different stages process different VPDUs simultaneously. A VPDU is a non-overlapping grid in the video picture, which is either a square unit, for example, each VPDU contains M×M luma pixels or N×N chroma pixels, or a VPDU can be a non-square unit. In hardware decoders, each VPDU in a picture is processed by one pipeline stage after another pipeline stage until each VPDU is processed by all the pipeline stages of video decoding. Different pipeline stages in the hardware decoder process different VDPUs simultaneously. Restricting a VPDU size to be within a size limit is a critical design issue in hardware implementation as the VPDU size is roughly proportional to the buffer size in most of the pipeline stages.

The dimension of a VPDU may be defined by an area, such as 4096 pixels, or a size, such as 64×64 luma samples or chroma samples. In another embodiment, a CTU is divided into one or more pipeline units, for example, each CTU is divided into M×N pipeline units. In HEVC hardware decoders, the VPDU size may be set to equal to the maximum Transform Block (TB) size, which is 32×32 for the luma component and 16×16 for the chroma components. Expending the maximum TB size improves the overall coding efficiency. In the VVC standard, the maximum TB size is enlarged from 32×32-L/16×16-C in the HEVC standard to 64×64-L/32×32-C, which is 4 times of the VPDU size for HEVC. Comparing to the HEVC standard which only employs quad-tree splitting, the VVC standard allows partitioning CTUs with more flexible splitting types. For example, when partitioning a 128×128 CTU by binary-tree splitting or ternary-tree splitting, the required VPDU size is increased to 128×128 luma pixels or 64×64 chroma pixels. In comparison to the HEVC standard, the required VPDU size is now 16 times larger, which dramatically increases the required buffer size for each pipeline stage in video processing. To reduce the VPDU size in the VVC standard, one constraint for BT and TT is proposed, and the VPDU size is defined as 64×64-L/32×32-C in the following.

For each CTU, two conditions governing the relationship between the VPDUs and CUs shall not be violated; the first condition is for a VPDU containing one or multiple CUS, the CUs have to be completely contained in the VPDU; and the second condition is for a CU containing one or more VPDUs, the VPDUs have to be completely contained in the CU. The proposed constraint further restricts the processing order of CUs so it shall not leave a VPDU and re-visit it later.

Figure 3:
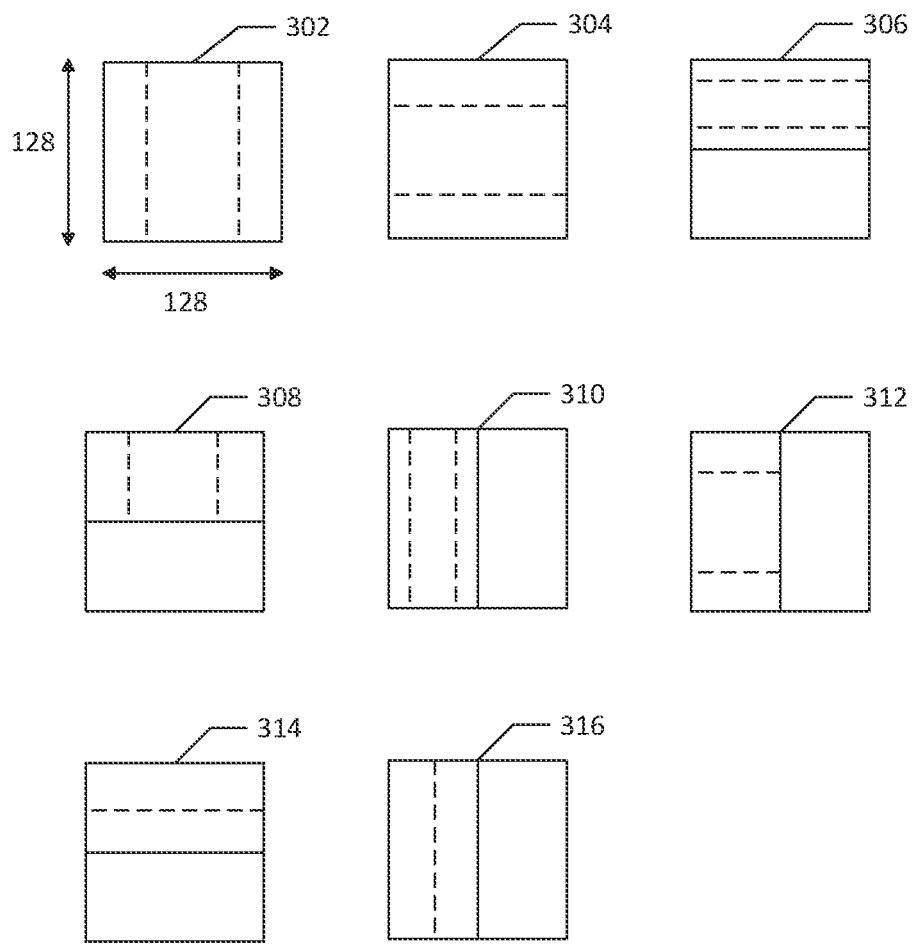
FIG. 3 illustrates examples of disallowed TT and BT partitioning in the VVC standard.

In the VVC standard, the above mentioned BT and TT constraint includes the following normative restrictions to prohibit invalid BT and TT splits. The CU size equal to 128×128, 128×64, or 64×128 is allowed. FIG. 3 illustrates examples of disallowed TT and BT partitioning in the VVC standard. The first restriction prohibits splitting a 128×128 CTU by a TT split as shown in CTU 302 and CTU 304 in FIG. 3. The second restriction prohibits splitting a 128×N or N×128 CU by a TT split, where N is less than or equal to 64. In FIG. 3, CU 306 and CU 308 are two examples of splitting a 128×64 CU by a TT split, and CU 310 and CU 312 are two examples of splitting a 64×128 CU by a TT split. The third restriction prohibits splitting a 128×N CU by a horizontal BT split, where N is less than or equal to 64. The fourth restriction prohibits splitting an N×128 CU by a vertical BT split, where N is less than or equal to 64. CU 314 in FIG. 3 is an example of splitting a 128×64 CU by a horizontal BT split, whereas CU 316 is an example of splitting a 64×128 CU by a vertical BT split.

Reduce Luma-Chroma Latency in Chroma Separated Tree In order to reduce luma-chroma latency in CST coding, when a 64×64 luma coding tree node is not split and Intra Sub-Partitions (ISP) is not used in this 64×64 CU or the 64×64 luma coding tree node is partitioned by quad-tree splitting, chroma CUs in the 32×32/32×16 chroma coding tree node are not allowed to use the CCLM modes except for the following ways. If the 32×32 chroma node is not split or is partitioned by quad-tree splitting, all chroma CUs in the 32×32 node can use the CCLM modes. If the 32×32 chroma node is partitioned with a horizontal BT splitting, and the 32×16 child node is not further split or is partitioned using a vertical BT splitting, all chroma CUs in the 32×16 child node can use the CCLM modes. In all other luma and chroma coding tree split conditions, the CCLM modes are not allowed for the chroma CUs.

Figure 4:
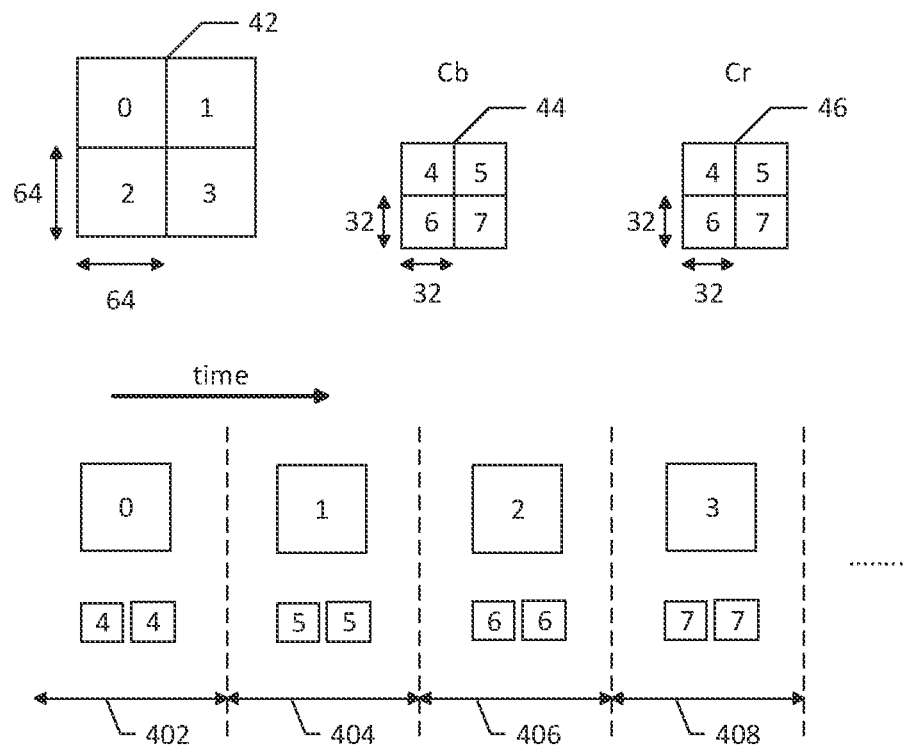
FIG. 4 illustrates an exemplary scheduling architecture for coding CTUs with share tree coding.

Interleave Manner with VPDU Partitions In conventional share tree coding, luma and chroma components are coded in an interleave manner with VPDU partitions. In VVC Intra slices, a 128×128 CU is implicitly split into four 64×64 CUs, and the VPDU size is 64×64 for the luma component and 32×32 for the chroma components. FIG. 4 illustrates an exemplary scheduling architecture for coding a current CTU with share tree coding in a pipeline stage, where the current CTU ($CTU_n$) is composed of a luma CTB 42 having 128×128 samples and two chroma CTBs 44 and 46 each having 64×64 samples. In the first VPDU time interval 402 for processing the current CTU by the pipeline stage, VPDU 0 from luma CTB 42, VPDU 4 from Cb CTB 44, and VPDU 4 from Cr CTB 46 are processed simultaneously. Similarly, in the second VPDU time interval 404, VPDU 1 from luma CTB 42, VPDU 5 from Cb CTB 44, and VPDU 5 from Cr CTB 46 are processed simultaneously. In the third VPDU time interval 406, VPDU 2 from luma CTB 42, VPDU 6 from Cb CTB 44, and VPDU 6 from Cr CTB 46 are processed simultaneously. In the fourth VPDU time interval 408, VPDU 3 from luma CTB 42, VPDU 7 from Cb CTB 44, and VPDU 7 from Cr CTB 46 are processed simultaneously. To support CST coding, the video coding system has to be backward compatible to the conventional share tree coding structure.

Figure 5:
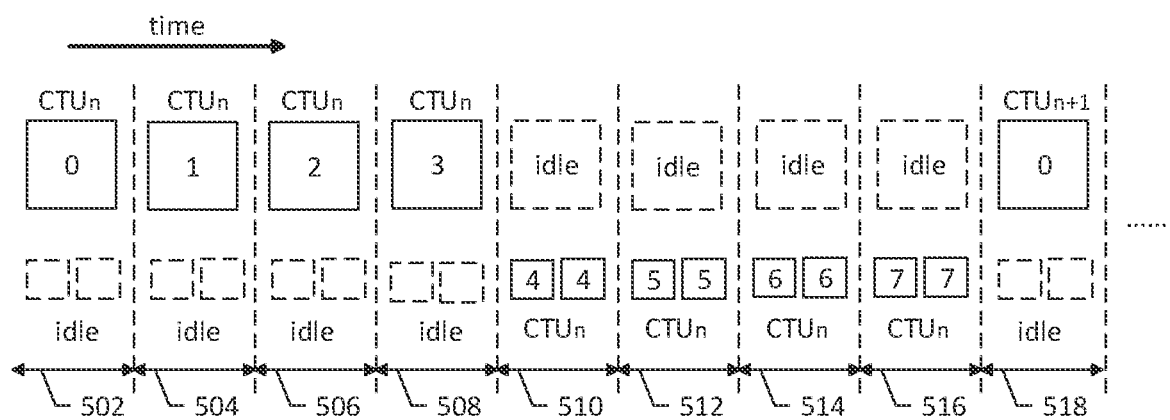
FIG. 5 illustrates a naive scheduling architecture for coding CTUs with chroma separate tree coding.

A possible method to process CTUs with chroma separated tree coding as shown in FIG. 5 is to delay the coding of chroma CTBs until the coding of the corresponding luma CTB is completed in order to retrieve the corresponding luma reconstructed samples and luma Intra angular modes. In the first four VPDU time intervals 502, 504, 506 and 508, only VPDU partitions 0 to 3 from the current luma CTB are processed as processing of chroma is postponed. After the coding of the current luma CTB is completed, VPDU partitions 4 to 7 from the current Cb CTB and the current Cr CTB are sequentially processed in the next four VPDU time intervals 510, 512, 514, and 516. In the next VPDU time interval 518, VPDU partition 0 from the subsequent luma CTB is processed. In this method, the throughput is decreased and the resource utilization is low compared to the scheduling architecture for conventional share tree coding as shown in FIG. 4. The luma coding resource is idle when the video coding system is coding chroma CTBs, and the chroma coding resource is idle when the video coding system is coding luma CTBs. There are several methods described in the following for implementing video coding enabling CST coding with better coding efficiency or lower coding complexity.

Method 1: Reuse Share Tree Coding Scheduling Architecture with Delay in Chroma Tree Coding Various embodiments of Method 1 improve the coding efficiency and increase the coding throughput by reusing the share tree coding scheduling architecture and applying one or more delay time intervals to process chroma pipeline units. These embodiments could be applied to video encoder or decoder implementations. In some embodiments of Method 1, the delay time interval is defined by a pipeline unit time interval or a predefined delay time interval, or the delay time interval is defined depending on available luma reconstruction samples. For example, the pipeline unit time interval is the aforementioned VPDU time interval. The share tree scheduling architecture as shown in FIG. 4 processes one luma VPDU and corresponding chroma VPDUs simultaneously by one pipeline stage in each VPDU time interval. Embodiments of the present invention simultaneously process one luma VPDU and at least one previous chroma VPDU by one pipeline stage within one VPDU time interval. In various embodiments of Method 1, the scheduling architecture for processing CTUs with CST coding reuses the share tree scheduling architecture but each chroma pipeline unis is processed by N pipeline unit time interval delayed from processing of a corresponding luma pipeline unit. N is an integer greater than or equal to 1. Embodiments of reusing the share tree scheduling architecture for CST coding perform processing of chroma pipeline units after beginning processing of the corresponding luma pipeline units in at least one pipeline stage. According to embodiments of Method 1, one luma pipeline unit and at least one previous chroma pipeline unit are encoded or decoded simultaneously by one pipeline stage in each pipeline unit time interval except for the first N pipeline unit time interval(s) and the last N pipeline unit time interval(s) for processing luma and chroma pipeline units in the current Intra slice. In some embodiments of Method 1, the luma pipeline unit processed simultaneously with the previous chroma pipeline unit(s) belongs to a current CTU of the current Intra slice, and the previous chroma pipeline unit(s) belongs to the current CTU or a previous CTU of the current Intra slice in a coding order. In luma tree coding, the video encoder or decoder updates luma related buffers such as a neighboring reconstruction/mode buffer and a luma reconstruction/mode buffer. Similarly, in chroma tree coding, the video encoder or decoder updates chroma related buffers such as a neighboring reconstruction/mode buffer and a chroma reconstruction/mode buffer.

The VPDU size is set to equal to the maximum transform unit size according to some embodiments, whereas the VDPU size is implicitly defined based on the profile or level in one video compression standard according to another embodiment. In one embodiment, a CTU is divided into one or more pipeline units, or so called VPDUs. A CTU may be divided into M×N pipeline units, for example, M and N are both equal to 2. In another embodiment, a CTU is divided into one or more grids, each grid is defined as a pipeline unit. The size of the pipeline unit can be set to equal to the maximum transform block size, for example, the pipeline unit for the luma component is set to 64×64 and the pipeline unit for the chroma components is set to 32×32 according to the VVC standard. In still another embodiment, the size of the luma pipeline units is 32×32 samples and the size of the chroma pipeline units is 16×16 samples.

Figure 6:
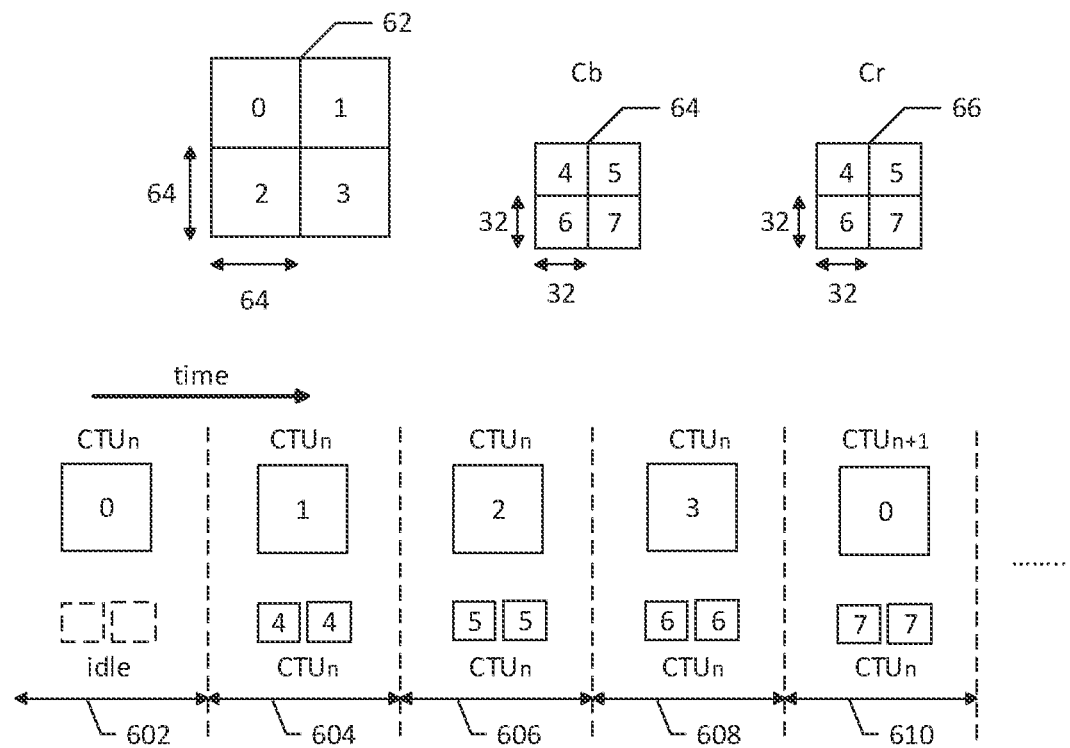
FIG. 6 illustrates an embodiment of a low-latency scheduling architecture for coding CTUs with chroma separate tree coding, where processing of chroma pipeline units is delayed by one pipeline unit time interval.

In one specific embodiment, the scheduling architecture for processing Intra slices coded with CST coding by one pipeline stage reuses the share tree scheduling architecture with one delay time interval for processing chroma pipeline units, where one delay time interval is equal to one pipeline unit time interval in this embodiment. As shown in FIG. 6, a current CTU ($CTU_n$) is composed of a 128×128 luma CTB 62 and two 64×64 chroma CTBs 64 and 66. The luma CTB 62 is divided into four 64×64 pipeline units 0, 1, 2, and 3, the Cb CTB 64 is divided into four 32×32 pipeline units 4, 5, 6, and 7, similarly, the Cr CTB 66 is also divided into four 32×32 pipeline units 4, 5, 6, and 7. In the first pipeline unit time interval 602, the first pipeline unit 0 from the luma CTB 62 is processed by the pipeline stage while the chroma coding resource is idle. In the second pipeline unit time interval 604, the second pipeline unit 1 from the luma CTB 62, the first pipeline unit 4 from the Cb CTB 64, and the first pipeline unit 4 from the Cr CTB 66 are processed simultaneously by the pipeline stage. In the third pipeline unit time interval 606, pipeline unit 2 from the luma CTB 62 and pipeline units 5 from the Cb and Cr CTBs 64 and 66 are processed simultaneously by the pipeline stage. In the fourth pipeline time interval 608, pipeline unit 3 from the luma CTB 62 and pipeline units 6 from the Cb and Cr CTBs 64 and 66 are processed simultaneously by the pipeline stage. In the fifth pipeline unit time interval 610, a first pipeline unit 0 from the luma CTB of the subsequent CTU ($CTU_{n+1}$) and pipeline units 7 from the Cb and Cr CTBs 64 and 66 of the current CTU ($CTU_n$) are processed simultaneously by the pipeline stage. Except for the first pipeline unit time interval 602 that only the luma pipeline unit is processed by the pipeline stage and the last pipeline unit time interval that only chroma pipeline units are processed by the pipeline stage, both luma and chroma pipeline units are simultaneously processed in each pipeline unit time interval.

Figure 7:
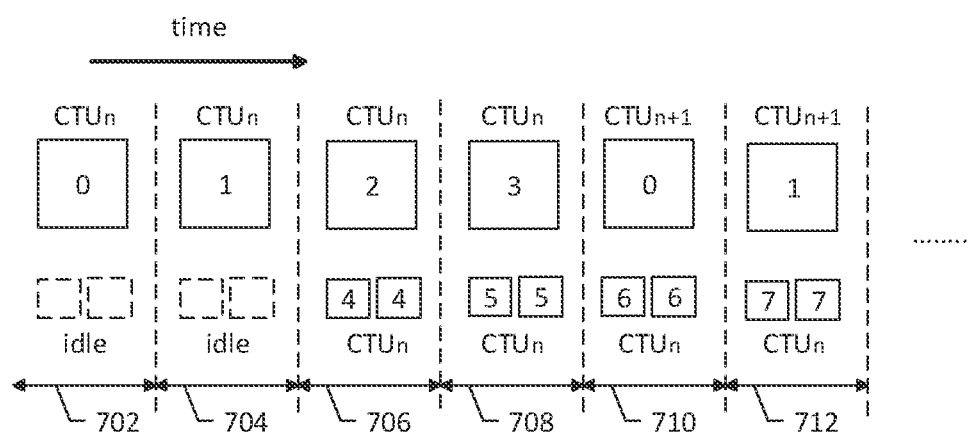
FIG. 7 illustrates an embodiment of a low-latency scheduling architecture for coding CTUs with chroma separate tree coding, where processing of chroma pipeline units is delayed by two pipeline unit time intervals.

FIG. 7 illustrates another embodiment of Method 1, where the coding schedule for Intra slices coded with CST coding uses the share tree coding schedule but having two delay time intervals for processing chroma pipeline units, where two delay time intervals are equal to two pipeline unit time intervals in this embodiment. In both the first and second VPDU time intervals 702 and 704, the chroma coding resource is idle while luma VPDUs (VPDU 0 and VPDU 1) from a current CTU ($CTU_n$) are processed by the pipeline stage. The first chroma VPDUs (VPDU 4) from Cb and Cr CTBs of the current CTU is processed by the pipeline stage in the third VPDU time interval 706 while luma VPDU 2 from the current CTU is processed by the pipeline stage. In the fourth VPDU time interval 708, the last luma VPUD (VPDU 3) from the current CTU is processed simultaneously by the pipeline stage with the second chroma VPDUs (VPDU 5) from Cb and Cr CTBs of the current CTU. In the fifth VPDU time interval 710, the first luma VPDU (VPDU 0) from the subsequent CTU ($CTU_{n+1}$) is processed simultaneously by the pipeline stage with the third chroma VPDUs (VPDU 6) from Cb and Cr CTBs of $CTU_n$. The last chroma VPDUs (VPDU 7) from Cb and Cr CTBs of $CTU_n$ are processed in the sixth VPDU time interval 712 together with the second luma VPDU (VPDU 1) from $CTU_{n+1}$.

Figure 8:
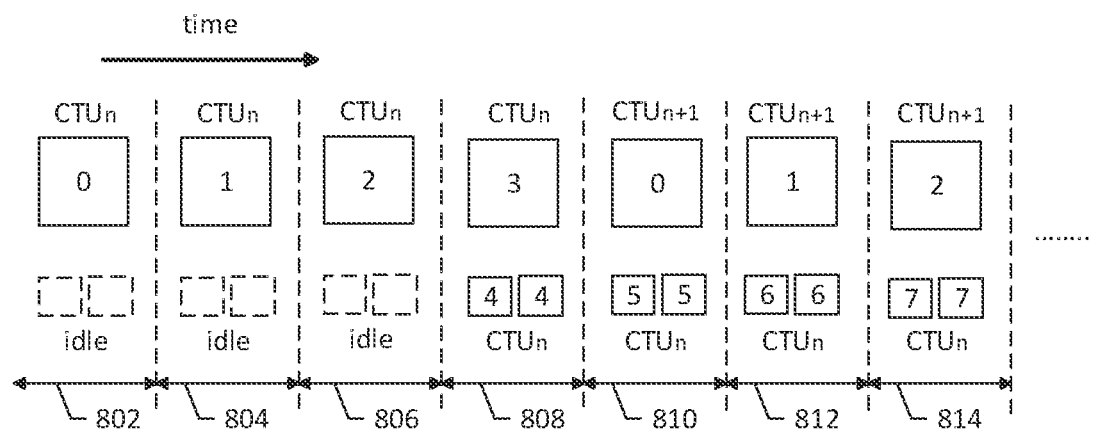
FIG. 8 illustrates an embodiment of a low-latency scheduling architecture for coding CTUs with chroma separate tree coding, where processing of chroma pipeline units is delayed by three pipeline unit time intervals.
Figure 9:
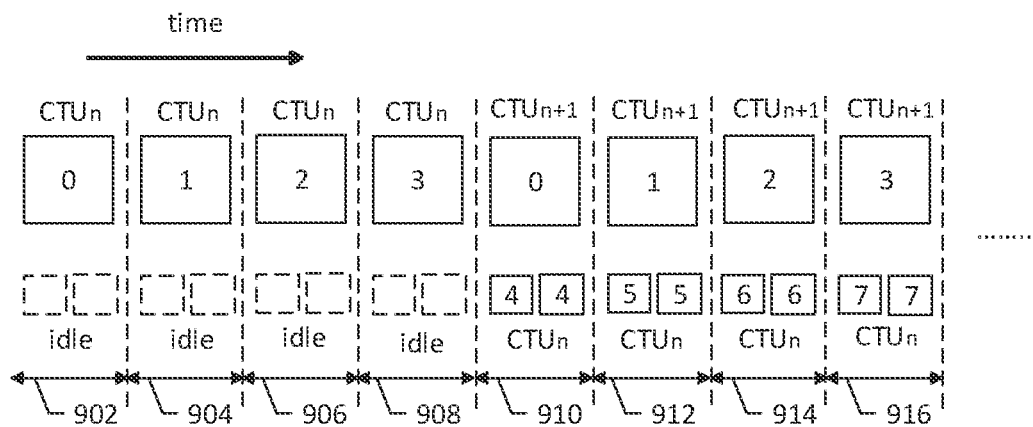
FIG. 9 illustrates an embodiment of a low-latency scheduling architecture for coding CTUs with chroma separate tree coding, where processing of chroma pipeline units is delayed by four pipeline unit time intervals.

FIG. 8 and FIG. 9 illustrate embodiments of some other variations of Method 1. FIG. 8 demonstrates an exemplary coding schedule for Intra slices coded with CST coding having a time delay of three pipeline unit time intervals. In each of the first three VPDU time intervals 802, 804, and 806, only one luma VPDU from a current CTU ($CTU_n$) is processed by the pipeline stage while the chroma coding resource is idle. The corresponding chroma VPDUs of each luma VPDU are processed by the pipeline stage after three VPDU time intervals. The first chroma VPDUs (VPDU 4) of Cb and Cr CTBs from the current CTU is processed simultaneously by the pipeline stage with the last luma VPDU (VPDU 3) from the current CTU in the fourth VPDU time interval 808. In each of the fifth, sixth, and seventh VPDU time intervals 810, 812, and 814, chroma VPDUs from the current CTU are processed with one luma VPDU from a subsequent CTU ($CTU_{n+1}$). FIG. 9 demonstrates an exemplary coding schedule for Intra slices coded with CST coding having a time delay of four pipeline unit time intervals. In each of the first four VPDU time intervals 902, 904, 906, and 908, only one luma VPDU from a current CTU ($CTU_n$) is processed by the pipeline stage while the chroma coding resource is idle. The corresponding chroma VPDUs of each luma VPDU are processed by the pipeline stage after four VPDU time intervals. The first chroma VPDUs (VPDU 4) of Cb and Cr CTBs from the current CTU is processed simultaneously by the pipeline stage with the first luma VPDU (VPDU 0) from a subsequent CTU ($CTU_{n+1}$) in the fifth VPDU time interval 910. Similarly, in each of the sixth, seventh, and eighth VPDU time intervals 912, 914, and 916, chroma VPDUs of Cb and Cr CTBs from the current CTU is processed simultaneously with one luma VPDU from the subsequent CTU.

Figure 10:
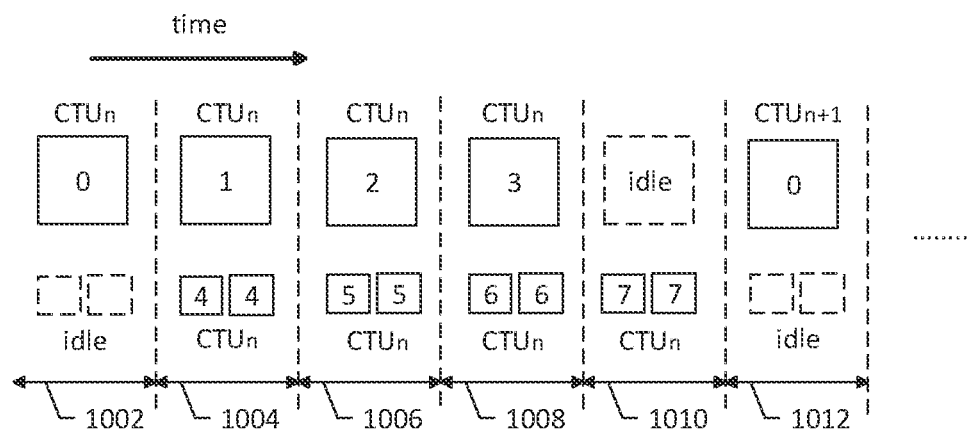
FIG. 10 illustrates an embodiment of a low-latency scheduling architecture for coding CTUs with chroma separate tree coding, where both luma and chroma coding resources are alternatively idle in one pipeline unit time interval for processing every CTU.

Method 2: Scheduling Architecture with Time Delay for Both Luma and Chroma Tree Coding In various embodiments according to Method 2, the luma and chroma coding resources are alternatively idle in one or more pipeline unit time interval for processing every CTU in order to prevent processing luma and chroma pipeline units from different CTUs simultaneously. FIG. 10 illustrates an embodiment of Method 2 with one VPDU time interval delay for luma tree and chroma tree coding. In a first VPDU time interval 1002, a first luma VPDU (VPDU 0) of a current CTU ($CTU_n$) is processed by the pipeline stage while the chroma coding resource is idle to wait for information associated with the luma component. In each of the second, third, and fourth VPDU time intervals 1004, 1006, and 1008, one luma VPDU and two chroma VPDUs are processed simultaneously by the pipeline stage. In the fifth VPDU time interval 1010, the last chroma VPDUs (VPDU 7) from Cb and Cr CTBs of the current CTU is processed by the pipeline stage while the luma coding resource is idle. In the sixth VPDU time interval 1012, the first luma VPDU (VPDU 0) from a subsequent CTU ($CTU_{n+1}$) is processed while the chroma coding resource is idle. In this embodiment, processing of each CTU by the pipeline stage occupies five VPDU time intervals as the chroma coding resource is idle in the first VPDU time interval and the luma coding resource is idle in the fifth VPDU time interval for each CTU. In various embodiments of Method 2, a first chroma pipeline unit of each CTU in the current Intra slice is processed by the pipeline stage after N pipeline unit time interval delayed from a first luma pipeline unit of the CTU; and a first luma pipeline unit of each subsequent CTU is processed after M pipeline unit time intervals delayed from processing a last luma pipeline unit of the CTU. M and N are integers, where M is equal to N.

Figure 11:
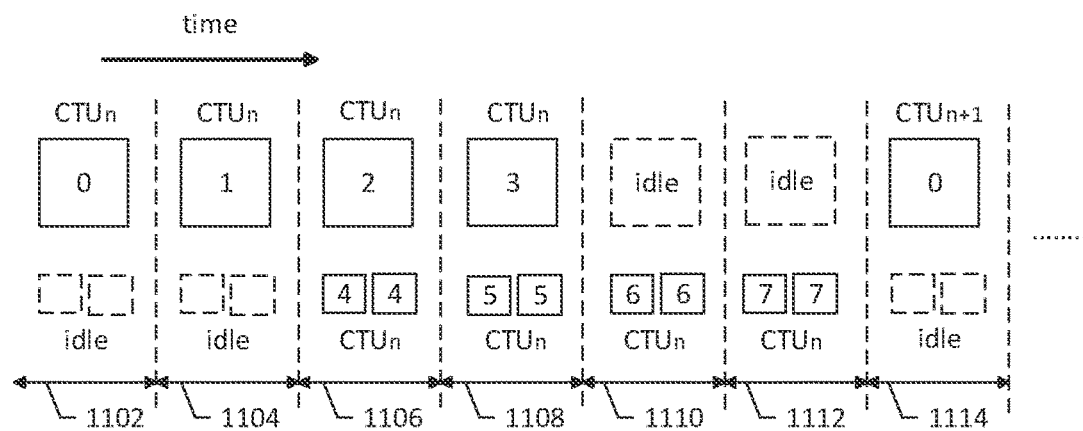
FIG. 11 illustrates an embodiment of a low-latency scheduling architecture for coding CTUs with chroma separate tree coding, where both luma and chroma coding resources are alternatively idle in two pipeline unit time intervals for processing every CTU.
Figure 12:
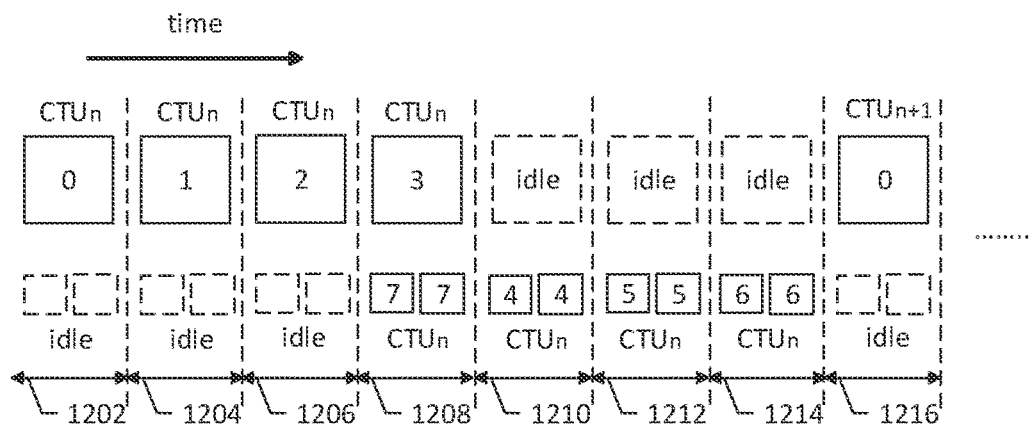
FIG. 12 illustrates an embodiment of a low-latency scheduling architecture for coding CTUs with chroma separate tree coding, where both luma and chroma coding resources are alternatively idle in three pipeline unit time intervals for processing every CTU.

FIG. 11 illustrates the coding schedule for Intra slices with CST coding according to another embodiment of Method 2. Processing of each CTU by the pipeline stage occupies six VPDU time intervals. In the first and second VPDU time intervals 1102 and 1104, the first and second luma VPDUs (VPDU 0 and VPDU 1) of a current CTU ($CTU_n$) are processed by the pipeline stage while the chroma coding resource is idle. In each of the third and fourth VPDU time intervals 1106 and 1108, one luma VPDU from the current CTU is processed simultaneously by the pipeline stage with one Cr VPDU and one Cb VPDU from the current CTU. In each of the fifth and sixth VPDU time intervals 1110 and 1112, one Cr VPDU and one Cb VPDU from the current CTU are processed by the pipeline stage while the luma coding resource is idle. In the seventh VPDU time interval 1114, the first luma VPDU (VPDU 0) from a subsequent CTU ($CTU_{n+1}$) is processed while the chroma coding resource is idle. FIG. 12 illustrates the coding schedule for Intra slices with CST coding according to another embodiment of Method 2. Processing of each CTU in this embodiment occupies seven VPDU time intervals, where the chroma coding resource is idle in the first three VPDU time intervals while the luma coding resource is idle in the last three VPDU time intervals. The coding of the chroma VPDUs are delayed by three VPDU time intervals in this embodiment. In the first three VPDU time intervals 1202, 1204, and 1206, three luma VPDUs of a current CTU ($CTU_n$) is processed by the pipeline stage, and in the fourth VPDU time interval 1208, the last luma VPDU of the current CTU, the first Cb VPDU of the current CTU, and the first Cr VPDU of the current CTU are processed by the pipeline stage. In the fifth, sixth, and seventh VPDU time intervals 1210, 1212, and 1214, the remaining chroma VPDUs are processed by the pipeline stage. In the eighth VPDU time interval 1216, the first luma VPDU of a subsequent CTU ($CTU_{n+1}$) is processed while the chroma coding resource is idle.

Figure 13:
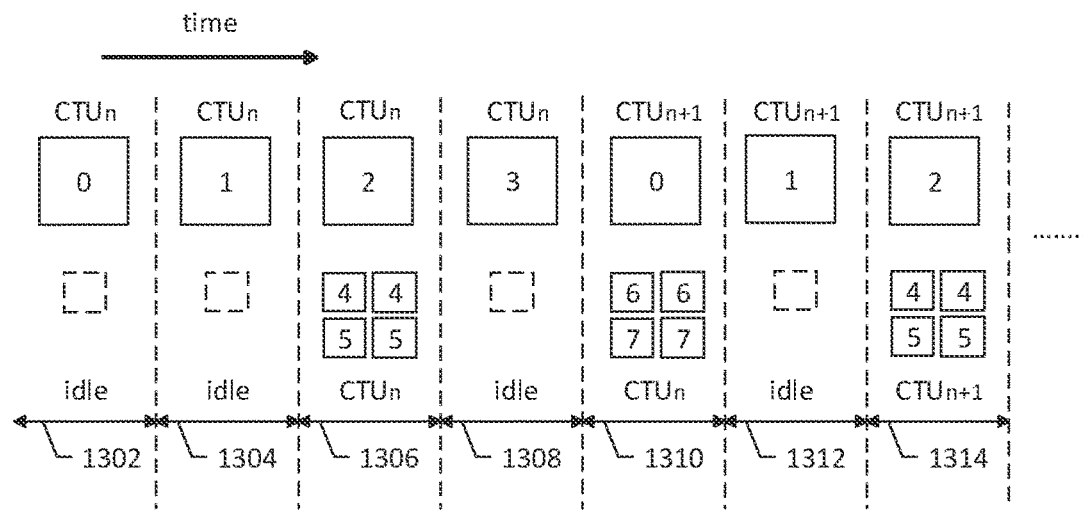
FIG. 13 illustrates an embodiment of a low-latency scheduling architecture for coding CTUs with chroma separate tree coding, where two chroma Cr pipeline units and two chroma Cb pipeline units or no chroma pipeline units are processed within one pipeline unit time interval.
Figure 14:
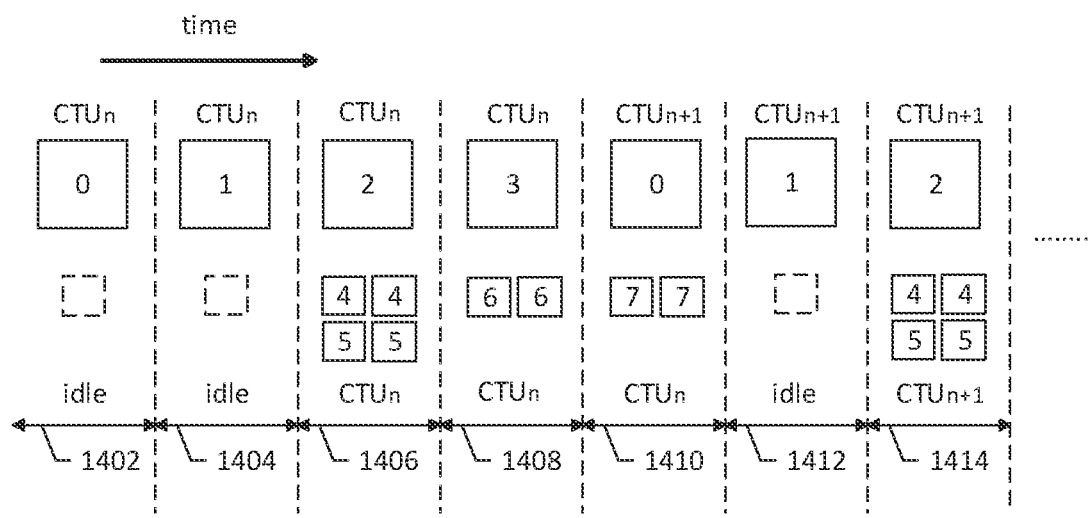
FIG. 14 illustrates another embodiment of a low-latency scheduling architecture for coding CTUs with chroma separate tree coding, where the number of chroma pipeline units processed in each pipeline unit time interval is varied.
Figure 15:
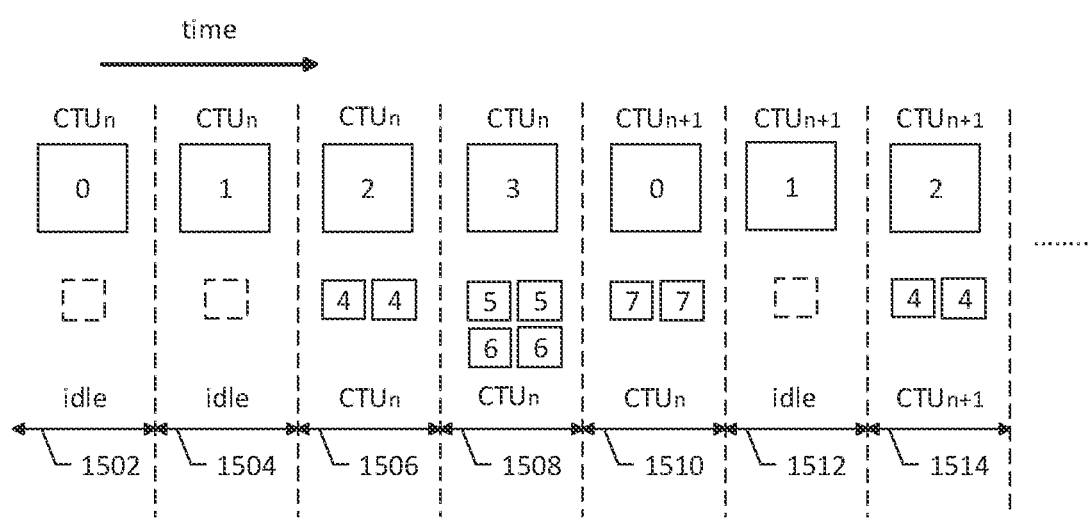
FIG. 15 illustrates yet another embodiment of a low-latency scheduling architecture for coding CTUs with chroma separate tree coding, where the number of chroma pipeline units processed in each pipeline unit time interval is varied.

Method 3: Scheduling Architecture with Time Delay and Uneven Scheduling In the embodiments of Method 3, the coding resource scheduling for chroma tree coding in the pipeline stage may be uneven for processing chroma VPDUs in Intra slices with CST coding. The coding resource scheduling for luma tree coding in the pipeline stage is still even in embodiments of Method 3. For example, multiple VPDUs from the Cb CTB of a current CTU and multiple VPDUs from the Cr CTB of the current CTU are processed together with a luma VPDU in certain VPDU time intervals while none of the chroma VPDUs is processed with a luma VPDU in the remaining VPDU time intervals. In another example, the chroma coding resource is idle in some VPDU time intervals, one Cb VPDU and one Cr VPDU are processed in some other VPDU time intervals, and two Cb VPDUs and two Cr VPDUs are processed in the remaining VPDU time intervals. FIG. 13 illustrates an embodiment of a pipeline stage according to Method 3 capable of coding two Cb VPDUs and two Cr VPDUs in one VPDU time interval. In the first two VPDU time intervals 1302 and 1304, the chroma coding resource is idle while the first two luma VPDUs (VPDU 0 and VPDU 1) from a current CTU ($CTU_n$) are encoded or decoded in the pipeline stage. In the third VPDU time interval 1306, the first two Cr VPDUs (VPDU 4 and VPDU 5) and the first two Cb VPDUs (VPDU 4 and VPDU 5) from the current CTU are encoded or decoded simultaneously with the third luma VPDU (VPDU 2) from the current CTU. The chroma coding resource is idle again in the fourth VPDU time interval 1308 while the last luma VPDU (VPDU 3) of the current CTU is processed by the pipeline stage. In the fifth VPDU time interval 1310, the last two Cr VPDUs (VPDU 6 and VPDU 7) and the last two Cb VPDUs (VPDU 6 and VPDU 7) of the current CTU are processed simultaneously with the first luma VPDU (VPDU 0) of a subsequent CTU ($CTU_{n+1}$). In the next VPDU time interval 1312, the luma VPDU (VPDU 1) of $CTU_{n+1}$ processed while the chroma coding resource is idle. Two Cr VPDUs and two Cb VPDUs of $CTU_{n+1}$ are processed together with the third luma VPDU (VPDU 2) of $CTU_{n+1}$ in VPDU time interval 1314. FIG. 14 illustrates another embodiment of a pipeline stage according to Method 3 capable of coding two Cb VPDUs and two Cr VPDUs in one VPDU time interval. In the first two VPDU time intervals 1402 and 1404, only luma VPDUs of a current CTU are processed by the pipeline stage. In the third VPDU time interval 1406, first two Cr VPDUs (VPDU 4 and VPDU 5) and first two Cb VPDUs (VPDU 4 and VPDU 5) of the current CTU are processed together with the third luma VPDU (VPDU 2) of the current CTU. In the fourth VPDU time interval 1408, one Cr VPDU (VPDU 6) and one Cb VPDU (VPDU 6) of the current CTU are processed with the last luma VPDU of the current CTU. In the fifth VPDU time interval 1410, the last Cr VPDU (VPDU 7) and Cb VPDU (VPDU 7) of the current CTU are processed simultaneously with the first luma VPDU (VPDU 0) of a subsequent CTU. Similarly, in the VPDU time interval 1412, the chroma coding resources are idle while a second luma VPDU (VPDU 1) of the subsequent CTU is processed by the pipeline stage. In the VPDU time interval 1414, first two Cr VPDUs (VPDU 4 and VPDU 5) and first two Cb VPDUs (VPDU 4 and VPDU 5) of the subsequent CTU are processed simultaneously with a third luma VPDU (VPDU 2) of the subsequent CTU. FIG. 15 illustrates another embodiment of Method 3. In this embodiment shown in FIG. 15, two Cr VPDUs and two Cb VPDUs are processed simultaneously with the last luma VPDU of the same CTU, whereas in the embodiment of FIG. 14, two Cr VPDUs and two Cb VPDUs are processed simultaneously with the third luma VPDU of the same CTU. In both the embodiments in FIG. 14 and FIG. 15, the chroma coding resource is always idle while the second luma VPDU of each CTU is processed by the pipeline stage. In the first two VPDU time intervals 1502 and 1504, the first and second luma VPDUs (VPDU 0 and VPDU 1) of a current CTU ($CTU_n$) is processed by the pipeline stage. In the third VPDU time interval 1506, one Cr VPDU (VPDU 4) and one Cb VPDU (VPDU 4) of the current CTU are processed simultaneously with the third luma VPDU (VPDU 2) of the current CTU. In the fourth VPDU time interval 1508, two Cr VPDUs (VPDU 5 and VPDU 6) and two Cb VPDUs (VPDU 5 and VPDU 6) of the current CTU are processed with the last luma VPDU (VPDU 3) of the current CTU. In the fifth VPDU time interval 1510, the last Cr VPDU (VPDU 7) and Cb VPDU (VPDU 7) are processed with the first luma VPDU (VPDU 0) of a subsequent CTU ($CTU_{n+1}$). In the next VPDU time interval 1512, the chroma coding resource is idle again while luma VPDU 1 of the subsequent CTU is processed. In the next VPDU time interval 1514, first chroma VPDUs (VPDU 4) of the subsequent CTU are processed simultaneously with a third luma VPDU (VPDU 2) of the subsequent CTU.

Figure 16:
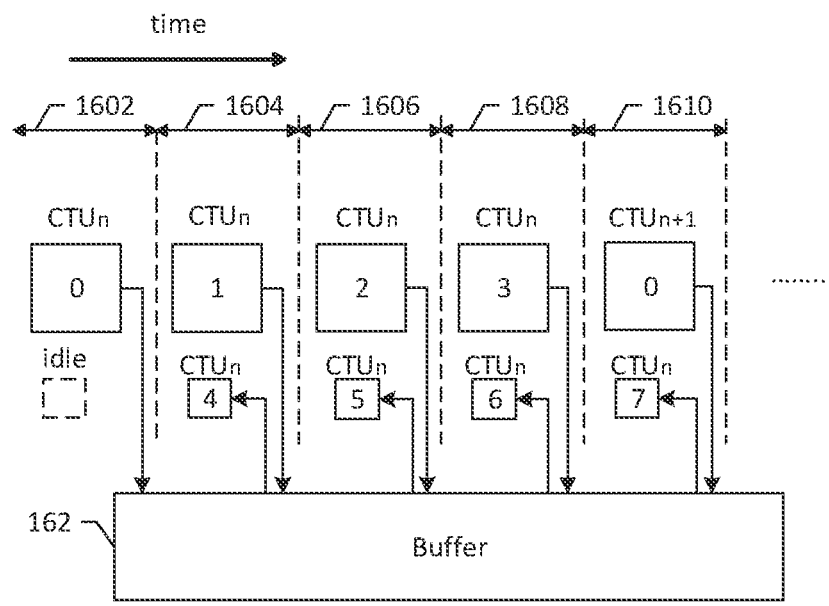
FIG. 16 illustrates read and write operations with a buffer for processing CTUs with chroma separate tree coding according to an embodiment of the present invention.

Buffer Design for Intra Slices with CST Coding Three additional memory spaces in the buffer are required for supporting various embodiments of scheduling architectures for processing Intra slices with CST coding. These additional memory spaces in the buffer store data required for processing the chroma components with CCLM and DM coding, including luma downsampled reconstruction samples, luma downsampled neighboring reconstruction samples, and luma Intra angular modes. The below embodiments assume the color format is 4:2:0. In one embodiment, for a chroma VPDU size equal to M×N, the luma downsampled reconstruction buffer size is also M×N. For example, the luma downsampled reconstruction buffer size is 32×32 when the luma VPDU size is 64×64 and the chroma VPDU size is 32×32. The 64×64 luma VPDU is reconstructed and downsampled to 32×32 before writing into the luma downsampled reconstruction buffer. The luma downsampled neighboring reconstruction buffer includes the luma downsampled reconstruction samples from above neighboring samples and the luma downsampled reconstruction samples from left neighboring samples according to some embodiments. For example, the luma downsampled neighboring reconstruction buffer size is (32+24)×(32+24) for a luma VPDU size of 64×64. In one embodiment, if the minimum luma block size is P×Q and the luma VPDU size is R×S, the luma Intra angular mode buffer size is (R/P)×(S/Q). For example, the minimum luma block size is 4×4 and the luma VPDU size is 64×64, the luma Intra angular mode buffer size is 16×16. FIG. 16 illustrates read and write operations for a pipeline stage with an additional buffer for processing luma and chroma VPDUs according to the embodiment of Method 1 with a delay of one VPDU time interval. The buffer 162 is composed of additional buffer spaces for storing luma downsampled reconstruction samples, luma downsampled neighboring reconstruction samples, and luma Intra angular modes. In the first VPDU time interval 1602, a first luma VPDU (VPDU 0) of a current CTU ($CTU_n$) is processed by the pipeline stage, luma reconstruction samples and luma neighboring reconstruction samples of VPDU 0 are downsampled and written into the buffer 162, and one or more luma Intra angular modes for VPDU 0 are also written into the buffer 162. In the second VPDU time interval 1604, associated luma downsampled reconstruction samples, luma downsampled neighboring reconstruction samples, and luma Intra angular modes are read from the buffer 162 for coding the first chroma VPDUs (VPDU 4) of the current CTU by the pipeline stage. During the second VPDU time interval 1604, the second luma VPDU (VPDU 1) is processed by the pipeline stage and the associated luma downsampled reconstruction samples, luma downsampled neighboring reconstruction samples, and luma Intra angular modes are written into the buffer 162. In the third VPDU time interval 1606, the third luma VPDU (VPDU 2) and the second chroma VPDUs (VPDU 5) are processed simultaneously by reading associated luma data from the buffer 162. The luma data of the third luma VPDU (VPDU 2) are also written into the buffer 162 in the third VPDU time interval 1606. In the next VPDU time interval 1608, the last luma VPDU (VPDU 3) of the current CTU is processed simultaneously with the third chroma VPDUs (VPDU 6) of the current CTU. Similarly, luma reconstruction samples of VPDU 3 are downsampled and written to the buffer 162, luma neighboring reconstruction samples of VPDU 3 are also downsampled and written to the buffer 162, and luma Intra angular modes of VPDU 3 are written to the buffer 162. The luma downsampled reconstruction samples, luma downsampled neighboring reconstruction samples, and luma Intra angular modes previously stored in the buffer 162 are read out for processing VPDU 6 of Cr CTB and Cb CTB from the current CTU in the fourth VPDU time interval 1608. In the fifth VPDU time interval 1610, the last VPDU (VPDU 7) of Cr CTB and Cb CTB from the current CTU are processed simultaneously with the first VPDU (VPDU 0) of a subsequent CTU ($CTU_{n+1}$) by reading associated luma downsampled reconstruction samples, luma downsampled neighboring reconstruction samples, and luma Intra angular modes from the buffer 162. The luma reconstruction samples and luma neighboring reconstruction samples are downsampled and stored in the buffer 162 as well as the luma Intra angular modes of VPDU 0 of $CTU_{n+1}$ are stored in the buffer 162 in the fifth VPDU time interval 1610.

Figure 17:
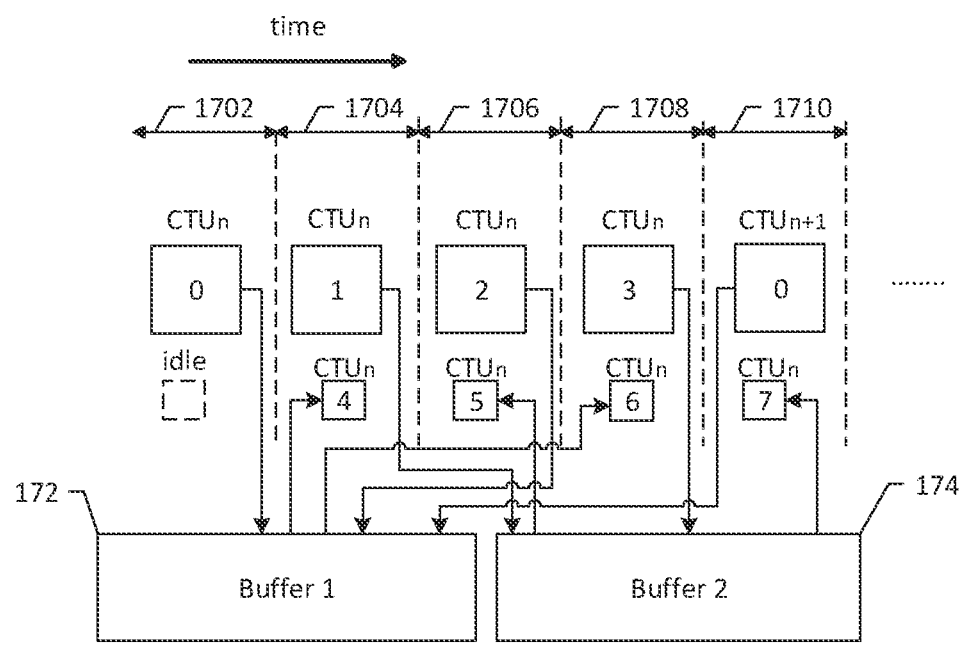
FIG. 17 illustrates read and write operations with a pair of ping-pong buffers for processing CTUs with chroma separate tree coding according to an embodiment of the present invention.

In cases the available cycle budget is tight for writing into and reading from the buffer, a ping-pong buffer design may be used to solve the bandwidth issue of reading and writing in the same VPDU time interval. FIG. 17 illustrates an embodiment of employing a ping-pong buffer for processing CTUs with CST coding according to the same scheduling architecture used in FIG. 16. In this embodiment, only read operations or only write operations will be used to access the first buffer 172 during each VPDU time interval in order to prevent accessing the first buffer 172 with both read and write operations within one VPDU time interval. Similarly, only read operations or only write operations will be used to access the second buffer 174 during each VPDU time interval in order to prevent accessing the second buffer 174 with both read and write operations within one VPDU time interval. In the first VPDU time interval 1702, the pipeline stage in the video coding system processes a first luma VPDU (VPDU 0) from a current CTU ($CTU_n$) and writes associated luma downsampled reconstruction samples, luma downsampled neighboring reconstruction samples, and luma Intra angular modes into the first buffer 172. In the second VPDU time interval 1704, the pipeline stage processes a first chroma VPDU (VPDU 4) from the current CTU by reading associated luma downsampled reconstruction samples, luma downsampled neighboring reconstruction samples, and luma Intra angular modes of VPDU 0 from the first buffer 172. In the meanwhile, the pipeline stage also processes a second luma VPDU (VPDU 1) of the current CTU and writes luma downsampled reconstruction samples, luma downsampled neighboring reconstruction samples, and luma Intra angular modes of VPDU 1 into the second buffer 174. In the third VPDU time interval 1706, the pipeline stage processes a second chroma VPDU (VPDU 5) from the current CTU by reading the associated luma data of VPDU 1 from the second buffer 174, and processes a third luma VPDU (VPDU 2) of the current CTU by writing associated luma data of VPDU 2 into the first buffer 172. In the fourth VPDU time interval 1708, the pipeline stage processes a third chroma VPDU (VPDU 6) from the current CTU by reading the associated luma data of VPDU 2 from the first buffer 172, and processes a last luma VPDU (VPDU 3) of the current CTU by writing associated luma data of VPDU 3 into the second buffer 174. In the fifth VPDU time interval 1710, the pipeline stage processes a last chroma VPDU (VPDU 7) from the current CTU by reading the associated luma data of VPDU 3 from the second buffer 174, and processes a first luma VPDU (VPDU 0) from a subsequent CTU ($CTU_{n+1}$) by writing associated luma data of VPDU 0 into the first buffer 172.

Figure 18:
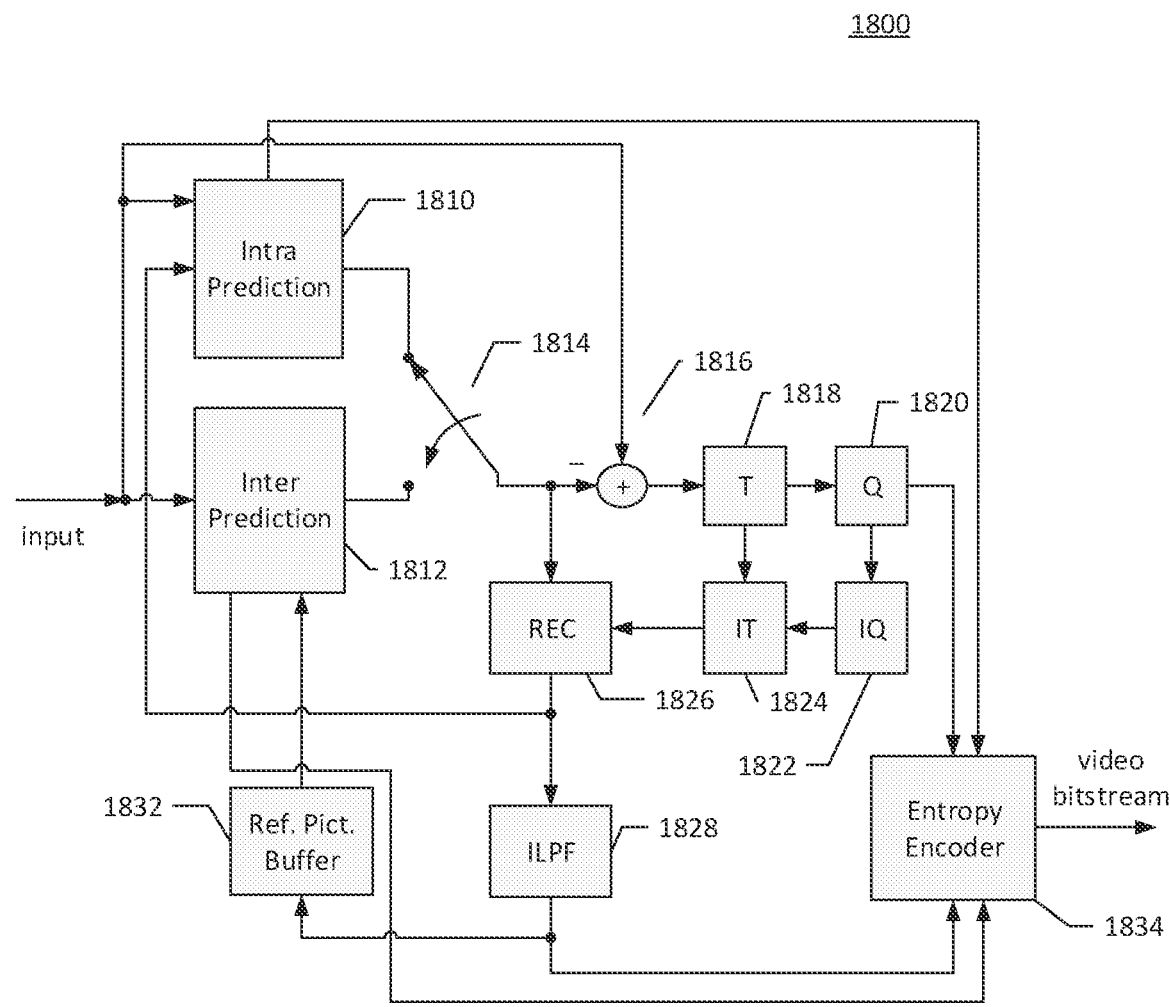
FIG. 18 illustrates an exemplary system block diagram for a video encoding system incorporating the low-latency video coding method according to embodiments of the present invention.

Exemplary Video Encoder and Video Decoder Implementing Present Invention Embodiments of the present invention may be implemented in video encoders and/or video decoders. For example, the low-latency scheduling architecture in the disclosed methods may be implemented in one or a combination of an entropy encoding module, an Inter, Intra, or prediction module, or a transform module of a video encoder, and/or an entropy decoding module, an inverse transform module, an Inter, Intra, or prediction module of a video decoder. Alternatively, any of the disclosed methods may be implemented as a circuit coupled to the entropy encoding module, the Inter, Intra, or prediction module, or the transform module of the video encoder and/or the entropy decoding module, the inverse transform module, the Inter, Intra, or prediction module of the video decoder, so as to provide the information needed by any of the modules. FIG. 18 illustrates an exemplary system block diagram for a Video Encoder 1800 implementing one or a combination of the various embodiments of the present invention. The video Encoder 1800 receives input video data of a current Intra slice composed of multiple CTUs. Each CTU consists of a luma CTB together with one or more corresponding chroma CTBs. Each luma CTB is partitioned into multiple non-overlapping luma pipeline units, and each chroma CTB is partitioned into multiple non-overlapping chroma pipeline units. Each of the luma and chroma pipeline units is processed by one pipeline stage after another pipeline stage in the Video Encoder 1800, and different pipeline stages process different pipeline units simultaneously. Luma and chroma pipeline units in the current Intra slice are encoded by performing processing of the chroma pipeline units after beginning processing of the luma pipeline units in at least one pipeline stage of the Video Encoder 1800 according to an embodiment. In another embodiment, luma and chroma pipeline units are encoded by delaying processing of the chroma pipeline units with respect to processing of the luma pipeline units in at least one pipeline stage of the Video Encoder 1800. One luma pipeline unit and at least one previous chroma pipeline unit are simultaneously encoded by the pipeline stage within one pipeline unit time interval. In various embodiments of the present invention, a first chroma pipeline unit of a first CTU in the current Intra slice is encoded by the pipeline stage after processing a first luma pipeline unit of the first CTU by a delay time interval. For example, the delay time interval is defined by a pipeline unit time interval. In some embodiments, chroma coding resources are idle in one or more predefined pipeline unit time intervals while luma coding resources are idle in one or more other pipeline unit time intervals, and at least one luma pipeline unit in the first CTU is encoded simultaneously by the pipeline stage with at least one previous chroma pipeline unit in the first CTU. All coding blocks in the current Intra slice are predicted by an Intra Prediction module 1810, and Intra predictors based on reconstructed video data of the current picture are output to a Switch 1814. An Inter Prediction module 1812 performs Motion Estimation (ME) and Motion Compensation (MC) to some coding blocks in P and B slices to provide inter predictors based on referencing video data from other picture or pictures. Either the Intra Prediction module 1810 or Inter Prediction module 1812 supplies a selected predictor of a coding block using the Switch 1814 to an Adder 1816 to form residues by subtracting the selected predictor from original video data of the coding block. The residues of the coding block are further processed by a Transformation module (T) 1818 followed by a Quantization module (Q) 1820. The transformed and quantized residual signal is then encoded by Entropy Encoder 1834 to form a video bitstream. The transformed and quantized residual signal of the coding block is processed by an Inverse Quantization module (IQ) 1822 and an Inverse Transformation module (IT) 1824 to recover the prediction residues. As shown in FIG. 18, the residues are recovered by adding back to the selected predictor at a Reconstruction module (REC) 1826 to produce reconstructed video data. The reconstructed video data may be stored in a Reference Picture Buffer (Ref. Pict. Buffer) 1832 and used for prediction of other pictures. The reconstructed video data from the REC 1826 may be subject to various impairments due to the encoding processing, consequently, at least one In-loop Processing Filter (ILPF) 1828 is conditionally applied to the luma and chroma components of the reconstructed video data before storing in the Reference Picture Buffer 1832 to further enhance picture quality.

Figure 19:
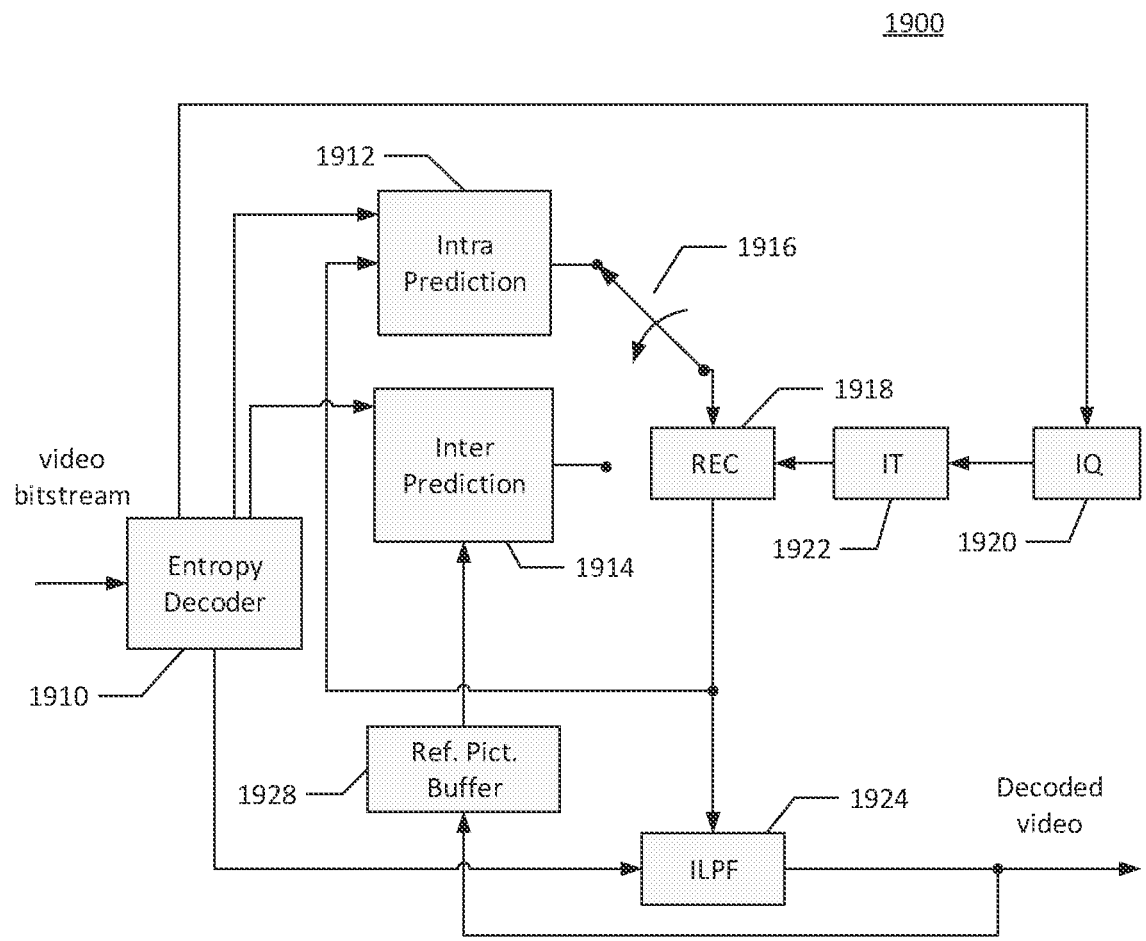
FIG. 19 illustrates an exemplary system block diagram for a video decoding system incorporating the low-latency video coding method according to embodiments of the present invention.

A corresponding Video Decoder 1900 for the Video Encoder 1800 of FIG. 18 is shown in FIG. 19. The video bitstream encoded by a video encoder is the input to the Video Decoder 1900 and is decoded by an Entropy Decoder 1910 to parse and recover the transformed and quantized residual signal and other system information of a current picture. The decoding process of the Video Decoder 1900 is similar to the reconstruction loop at the Video Encoder 1800, except the Video Decoder 1900 only requires motion compensation prediction in an Inter Prediction module 1914. Each block in each slice is decoded by either an Intra Prediction module 1912 or Inter Prediction module 1914. A Switch 1916 selects an Intra predictor from the Intra Prediction module 1912 or Inter predictor from the Inter Prediction module 1914 according to decoded mode information. In various embodiments of the present invention, the Intra Prediction module 1912 is employed to decode all CTUs in a current Intra slice. Each luma CTB is partitioned into multiple non-overlapping luma pipeline units and each chroma CTB is partitioned into multiple non-overlapping chroma pipeline units. Each of the luma and chroma pipeline units is decoded by one pipeline stage after another pipeline stage in the Video Decoder 1900, and different pipeline stages process different pipeline units simultaneously. Luma and chroma pipeline units in the current Intra slice are decoded by performing processing of the chroma pipeline units after beginning processing of the luma pipeline units in at least one pipeline stage of the Video Decoder 1900 according to an embodiment. In another embodiment, luma and chroma pipeline units are decoded by delaying processing of the chroma pipeline units with respect to processing of the luma pipeline units in at least one pipeline stage of the Video Decoder 1900. One luma pipeline unit and at least one previous chroma pipeline unit are simultaneously decoded by the pipeline stage within one pipeline unit time interval. The transformed and quantized residual signal is recovered by an Inverse Quantization module (IQ) 1920 and an Inverse Transformation module (IT) 1922. The IQ module 1920 is also called a de-quantization module. The recovered residual signal is reconstructed by adding back the predictor in a Reconstruction (REC) module 1918 to produce reconstructed video. The reconstructed video of CTUs within each slice in the current picture are always processed by a raster scan order in the current picture. The reconstructed video is further conditionally processed by at least one In-loop Processing Filter (ILPF) 1924 to generate final decoded video. If the currently decoded picture is a reference picture, the reconstructed video of the currently decoded picture is also stored in a Reference Picture Buffer (Ref. Pict. Buffer) 1928 for later pictures in decoding order.

Various components of the Video Encoder 1800 and Video Decoder 1900 in FIG. 18 and FIG. 19 may be implemented by hardware components, one or more processors configured to execute program instructions stored in a memory, or a combination of hardware and processor. For example, a processor executes program instructions to control processing one luma pipeline unit and at least one previous chroma pipeline unit simultaneously within one pipeline unit time interval. The processor is equipped with a single or multiple processing cores. In some examples, the processor executes program instructions to perform functions in some components in the Encoder 1800 and Decoder 1900, and the memory electrically coupled with the processor is used to store the program instructions, information corresponding to the reconstructed images of blocks, and/or intermediate data during the encoding or decoding process. In some examples, the Video Encoder 1800 may signal information by including one or more syntax elements in a video bitstream, and the corresponding Video Decoder 1900 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 18 and 19, the Encoder 1800 and Decoder 1900 may be implemented in the same electronic device, so various functional components of the Encoder 1800 and Decoder 1900 may be shared or reused if implemented in the same electronic device. For example, one or more of the Reconstruction module 1826, Inverse Transformation module 1824, Inverse Quantization module 1822, In-loop Processing Filter 1828, and Reference Picture Buffer 1832 in FIG. 18 may also be used to function as the Reconstruction module 1918, Inverse Transformation module 1922, Inverse Quantization module 1920, In-loop Processing Filter 1924, and Reference Picture Buffer 1928 in FIG. 19, respectively.

Embodiments of more efficient video processing methods may be implemented in a circuit integrated into a video compression chip or program code integrated into video compression software to perform the processing described above. For examples, encoding or decoding luma and chroma pipeline units by delaying processing of the chroma pipeline units with respect to processing of the luma pipeline units may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A low-latency video coding method in a video encoding or decoding system, comprising:
  receiving input data associated with a current Intra slice, wherein the current Intra slice is composed of a plurality of Coding Tree Units (CTUs) for encoding or decoding, and each CTU consists of a luminance (luma) Coding Tree Block (CTB) and one or more chrominance (chroma) CTBs;
  partitioning each luma CTB into a plurality of non-overlapping luma pipeline units and partitioning each chroma CTB into a plurality of non-overlapping chroma pipeline units, wherein each of the luma and chroma pipeline units is processed by one pipeline stage after another pipeline stage in the video encoding or decoding system, and different pipeline stages process different pipeline units simultaneously; and
  encoding or decoding the CTUs in the current Intra slice by performing processing of the chroma pipeline units after beginning processing of the corresponding luma pipeline units in at least one pipeline stage, wherein one luma pipeline unit and at least one previous chroma pipeline unit are simultaneously processed by the pipeline stage within one pipeline unit time interval, wherein a first luma pipeline unit of a first CTU in the current Intra slice is processed by the pipeline stage in a first pipeline unit time interval and a first chroma pipeline unit of the first CTU in the current Intra slice is processed by the pipeline stage in a predefined pipeline unit time interval, wherein the predefined pipeline unit time interval is N pipeline unit time intervals delayed from the first pipeline unit time interval, wherein N is an integer greater than or equal to 1, wherein N is 1, the predefined pipeline unit time interval is a second pipeline unit time interval, each luma CTB is partitioned into four luma pipeline units, and each chroma CTB is partitioned into four chroma pipeline units, wherein the first chroma pipeline unit of the first CTU is processed simultaneously by the pipeline stage with a second luma pipeline unit of the first CTU in the second pipeline unit time interval, a second chroma pipeline unit of the first CTU is processed simultaneously by the pipeline stage with a third luma pipeline unit of the first CTU in a third pipeline unit time interval, a third chroma pipeline unit of the first CTU is processed simultaneously by the pipeline stage with a last luma pipeline unit of the first CTU in a fourth pipeline unit time interval, and a last chroma pipeline unit of the first CTU is processed simultaneously by the pipeline stage with a first luma pipeline unit of a second CTU in the current Intra slice in a fifth pipeline unit time interval.

2. The method of claim 1, wherein a first chroma pipeline unit of a first CTU in the current Intra slice is processed by the pipeline stage after processing a first luma pipeline unit of the first CTU in the current Intra slice by a delay time interval, wherein the delay time interval is defined by a pipeline unit time interval, a predefined delay time interval, or the delay time interval is defined depending on available luma reconstruction samples.

3. The method of claim 1, wherein one luma pipeline unit and at least one previous chroma pipeline unit are encoded or decoded simultaneously by the pipeline stage in each pipeline unit time interval except for the first N pipeline unit time interval(s) and the last N pipeline unit time interval(s) for processing luma and chroma pipeline units in the current Intra slice.

4. The method of claim 3, wherein the luma pipeline unit belongs to a current CTU of the current Intra slice and the at least one previous chroma pipeline unit belong to the current CTU or a previous CTU of the current Intra slice in a coding order.

5. The method of claim 3, wherein each CTU consists of a luma CTB, a chroma Cr CTB and a chroma Cb CTB, wherein one luma pipeline unit is encoded or decoded simultaneously by the pipeline stage with one previous chroma Cr pipeline unit and one previous chroma Cb pipeline unit in each pipeline unit time interval except for the first N pipeline unit time interval(s) and the last N pipeline unit time interval(s).

6. The method of claim 1, wherein one luma pipeline unit of the first CTU and one previous chroma pipeline unit of the first CTU are encoded or decoded simultaneously by the pipeline stage in at least one pipeline unit time interval, and a first luma pipeline unit of a second CTU in the current Intra slice is processed by the pipeline stage after M pipeline unit time intervals delayed from processing a last luma pipeline unit of the first CTU, wherein M is equal to N, and N is equal to 1, 2, or 3.

7. The method of claim 1, wherein one luma pipeline unit of the first CTU and multiple chroma pipeline units of the first CTU are processed simultaneously by the pipeline stage in at least one pipeline unit time interval.

8. The method of claim 7, wherein first and second chroma pipeline units of each CTU are processed simultaneously by the pipeline stage with a third luma pipeline unit of the same CTU, and third and fourth chroma pipeline units of each CTU are processed simultaneously by the pipeline stage with a first luma pipeline unit of a subsequent CTU.

9. The method of claim 7, wherein first and second chroma pipeline units of each CTU are processed simultaneously by the pipeline stage with a third luma pipeline unit of the same CTU, a third chroma pipeline unit of each CTU is processed simultaneously by the pipeline stage with a last luma pipeline unit of the same CTU, and a last chroma pipeline unit of each CTU is processed simultaneously by the pipeline stage with a first luma pipeline unit of a subsequent CTU.

10. The method of claim 7, wherein a first chroma pipeline unit of each CTU is processed simultaneously by the pipeline stage with a third luma pipeline unit of the same CTU, second and third chroma pipeline units of each CTU are processed simultaneously by the pipeline stage with a last pipeline unit of the same CTU, and a last chroma pipeline unit of each CTU is processed simultaneously by the pipeline stage with a first luma pipeline unit of a subsequent CTU.

11. The method of claim 1, wherein for a pipeline unit containing one or more Coding Units (CUs), the CUs are completely contained in the pipeline unit, otherwise for a CU containing one or more pipeline units, the pipeline units are completely contained in the CU.

12. The method of claim 1, wherein sizes of the luma and chroma pipeline units are set to equal to maximum transform unit sizes of luma and chroma components respectively, or are implicitly defined based on a profile or level in a video compression standard.

13. The method of claim 1, wherein the current Intra slice is encoded or decoded with Chroma Separated Tree (CST) enabling luma CTB and chroma CTBs in one CTU to be encoded or decoded in different coding tree structures.

14. The method of claim 1, wherein a buffer is used for encoding or decoding CTUs in the current Intra slice, the method further comprising:
downsampling luma reconstruction samples and luma neighboring reconstruction samples for each luma pipeline unit;
writing luma downsampled reconstruction samples, luma downsampled neighboring reconstruction samples, and luma Intra angular modes associated with each luma pipeline unit into the buffer; and
reading luma downsampled reconstruction samples, luma downsampled neighboring reconstruction samples, and luma Intra angular modes of an associated luma pipeline unit from the buffer for encoding or decoding a chroma pipeline unit using Cross-Component Linear Model (CCLM) and Direct Mode (DM) in Intra prediction.

15. The method of claim 1, wherein a pair of ping-pong buffers is used for encoding or decoding the current Intra slice, the method further comprising:

downsampling luma reconstruction samples and luma neighboring reconstruction samples for each luma pipeline unit in the current Intra slice;

writing luma downsampled reconstruction samples, luma downsampled neighboring reconstruction samples, and luma Intra angular modes associated with even number luma pipeline units of each CTU into a first buffer;

writing luma downsampled reconstruction samples, luma downsampled neighboring reconstruction samples, and luma Intra angular modes associated with odd number luma pipeline units of each CTU into a second buffer;

reading luma downsampled reconstruction samples, luma downsampled neighboring reconstruction samples, and luma Intra angular modes of an associated even number luma pipeline unit from the first buffer for encoding or decoding an odd number chroma pipeline unit using Cross-Component Linear Model (CCLM) and Direct Mode (DM); and reading luma downsampled reconstruction samples, luma downsampled neighboring reconstruction samples, and luma Intra angular modes of an associated odd number luma pipeline unit from the second buffer for encoding or decoding an even number chroma pipeline unit using CCLM and DM.

16. An apparatus of low-latency video coding method in a video encoding or decoding system, the apparatus comprising one or more electronic circuits configured for:

receiving input data associated with a current Intra slice, wherein the current Intra slice is composed of a plurality of Coding Tree Units (CTUs) for encoding or decoding, and each CTU consists of a luminance (luma) Coding Tree Block (CTB) and one or more chrominance (chroma) CTBs;

partitioning each luma CTB into a plurality of non-overlapping luma pipeline units and partitioning each chroma CTB into a plurality of non-overlapping chroma pipeline units, wherein each of the luma and chroma pipeline units is processed by one pipeline stage after another pipeline stage in the video encoding or decoding system, and different pipeline stages process different pipeline units simultaneously; and encoding or decoding the CTUs in the current Intra slice by performing processing of the chroma pipeline units after beginning processing of the luma pipeline units in at least one pipeline stage, wherein one luma pipeline unit and at least one previous chroma pipeline unit are simultaneously processed by the pipeline stage within one pipeline unit time interval, wherein a first luma pipeline unit of a first CTU in the current Intra slice is processed by the pipeline stage in a first pipeline unit time interval and a first chroma pipeline unit of the first CTU in the current Intra slice is processed by the pipeline stage in a predefined pipeline unit time interval, wherein the predefined pipeline unit time interval is N pipeline unit time intervals delayed from the first pipeline unit time interval, wherein N is an integer greater than or equal to 1, wherein N is 1, the predefined pipeline unit time interval is a second pipeline unit time interval, each luma CTB is partitioned into four luma pipeline units, and each chroma CTB is partitioned into four chroma pipeline units, wherein the first chroma pipeline unit of the first CTU is processed simultaneously by the pipeline stage with a second luma pipeline unit of the first CTU in the second pipeline unit time interval, a second chroma pipeline unit of the first CTU is processed simultaneously by the pipeline stage with a third luma pipeline unit of the first CTU in a third pipeline unit time interval, a third chroma pipeline unit of the first CTU is processed simultaneously by the pipeline stage with a last luma pipeline unit of the first CTU in a fourth pipeline unit time interval, and a last chroma pipeline unit of the first CTU is processed simultaneously by the pipeline stage with a first luma pipeline unit of a second CTU in the current Intra slice in a fifth pipeline unit time interval.

17. A low-latency video coding method in a video encoding or decoding system, comprising:

receiving input data associated with a current Intra slice, wherein the current Intra slice is composed of a plurality of Coding Tree Units (CTUs) for encoding or decoding, and each CTU consists of a luminance (luma) Coding Tree Block (CTB) and one or more chrominance (chroma) CTBs;

partitioning each luma CTB into a plurality of non-overlapping luma pipeline units and partitioning each chroma CTB into a plurality of non-overlapping chroma pipeline units, wherein each of the luma and chroma pipeline units is processed by one pipeline stage after another pipeline stage in the video encoding or decoding system, and different pipeline stages process different pipeline units simultaneously; and encoding or decoding the CTUs in the current Intra slice by performing processing of the chroma pipeline units after beginning processing of the corresponding luma pipeline units in at least one pipeline stage, wherein one luma pipeline unit and at least one previous chroma pipeline unit are simultaneously processed by the pipeline stage within one pipeline unit time interval, wherein a first luma pipeline unit of a first CTU in the current Intra slice is processed by the pipeline stage in a first pipeline unit time interval and a first chroma pipeline unit of the first CTU in the current Intra slice is processed by the pipeline stage in a predefined pipeline unit time interval, wherein the predefined pipeline unit time interval is N pipeline unit time intervals delayed from the first pipeline unit time interval, wherein N is an integer greater than or equal to 1, wherein one luma pipeline unit of the first CTU and multiple chroma pipeline units of the first CTU are processed simultaneously by the pipeline stage in at least one pipeline unit time interval, wherein first and second chroma pipeline units of each CTU are processed simultaneously by the pipeline stage with a third luma pipeline unit of the same CTU, and third and fourth chroma pipeline units of each CTU are processed simultaneously by the pipeline stage with a first luma pipeline unit of a subsequent CTU, or wherein first and second chroma pipeline units of each CTU are processed simultaneously by the pipeline stage with a third luma pipeline unit of the same CTU, a third chroma pipeline unit of each CTU is processed simultaneously by the pipeline stage with a last luma pipeline unit of the same CTU, and a last chroma pipeline unit of each CTU is processed simultaneously by the pipeline stage with a first luma pipeline unit of a subsequent CTU, or wherein a first chroma pipeline unit of each CTU is processed simultaneously by the pipeline stage with a third luma pipeline unit of the same CTU, second and third chroma pipeline units of each CTU are processed simultaneously by the pipeline stage with a last pipeline unit of the same CTU, and a last chroma pipeline unit of each CTU is processed simultaneously by the pipeline stage with a first luma pipeline unit of a subsequent CTU.

18. An apparatus of low-latency video coding method in a video encoding or decoding system, the apparatus comprising one or more electronic circuits configured for:

receiving input data associated with a current Intra slice, wherein the current Intra slice is composed of a plurality of Coding Tree Units (CTUs) for encoding or decoding, and each CTU consists of a luminance (luma) Coding Tree Block (CTB) and one or more chrominance (chroma) CTBs;

partitioning each luma CTB into a plurality of non-overlapping luma pipeline units and partitioning each chroma CTB into a plurality of non-overlapping chroma pipeline units, wherein each of the luma and chroma pipeline units is processed by one pipeline stage after another pipeline stage in the video encoding or decoding system, and different pipeline stages process different pipeline units simultaneously; and encoding or decoding the CTUs in the current Intra slice by performing processing of the chroma pipeline units after beginning processing of the luma pipeline units in at least one pipeline stage, wherein one luma pipeline unit and at least one previous chroma pipeline unit are simultaneously processed by the pipeline stage within one pipeline unit time interval, wherein a first luma pipeline unit of a first CTU in the current Intra slice is processed by the pipeline stage in a first pipeline unit time interval and a first chroma pipeline unit of the first CTU in the current Intra slice is processed by the pipeline stage in a predefined pipeline unit time interval, wherein the predefined pipeline unit time interval is N pipeline unit time intervals delayed from the first pipeline unit time interval, wherein N is an integer greater than or equal to 1, wherein one luma pipeline unit of the first CTU and multiple chroma pipeline units of the first CTU are processed simultaneously by the pipeline stage in at least one pipeline unit time interval, wherein first and second chroma pipeline units of each CTU are processed simultaneously by the pipeline stage with a third luma pipeline unit of the same CTU, and third and fourth chroma pipeline units of each CTU are processed simultaneously by the pipeline stage with a first luma pipeline unit of a subsequent CTU, or wherein first and second chroma pipeline units of each CTU are processed simultaneously by the pipeline stage with a third luma pipeline unit of the same CTU, a third chroma pipeline unit of each CTU is processed simultaneously by the pipeline stage with a last luma pipeline unit of the same CTU, and a last chroma pipeline unit of each CTU is processed simultaneously by the pipeline stage with a first luma pipeline unit of a subsequent CTU, or wherein a first chroma pipeline unit of each CTU is processed simultaneously by the pipeline stage with a third luma pipeline unit of the same CTU, second and third chroma pipeline units of each CTU are processed simultaneously by the pipeline stage with a last pipeline unit of the same CTU, and a last chroma pipeline unit of each CTU is processed simultaneously by the pipeline stage with a first luma pipeline unit of a subsequent CTU.

* * * * *